US012635009B2

(12) United States Patent
Jung et al.

(10) Patent No.: US 12,635,009 B2
(45) Date of Patent: May 19, 2026

(54) LOGICAL CHANNEL HANDLING IN WIRELESS COMMUNICATION SYSTEM

(71) Applicant: LG ELECTRONICS INC., Seoul (KR)

(72) Inventors: Sunghoon Jung, Seoul (KR); Jiwon Kang, Seoul (KR); Hongsuk Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 308 days.

(21) Appl. No.: 18/547,453

(22) PCT Filed: Jun. 19, 2023

(86) PCT No.: PCT/KR2023/008451
§ 371 (c)(1),
(2) Date: Aug. 22, 2023

(87) PCT Pub. No.: WO2023/249350
PCT Pub. Date: Dec. 28, 2023

(65) Prior Publication Data
US 2025/0048456 A1      Feb. 6, 2025

Related U.S. Application Data

(60) Provisional application No. 63/353,853, filed on Jun. 21, 2022.

(51) Int. Cl.
*H04W 76/10* (2018.01)
*H04W 72/231* (2023.01)
*H04W 72/56* (2023.01)
*H04W 80/02* (2009.01)

(52) U.S. Cl.
CPC ......... *H04W 76/10* (2018.02); *H04W 72/231* (2023.01); *H04W 72/56* (2023.01); *H04W 80/02* (2013.01)

(58) Field of Classification Search
CPC ... H04W 72/231; H04W 72/50; H04W 72/56; H04W 72/563; H04W 76/10
See application file for complete search history.

(56) References Cited

U.S. PATENT DOCUMENTS

2021/0045142 A1* 2/2021 Joseph ................. H04L 5/0044
2021/0099898 A1* 4/2021 You ....................... H04W 24/08
2021/0153071 A1* 5/2021 Kim ..................... H04W 24/10
(Continued)

*Primary Examiner* — Jeong S Park
(74) *Attorney, Agent, or Firm* — LEE, HONG, DEGERMAN, KANG & WAIMEY

(57) ABSTRACT

The present disclosure relates to logical channel handling in wireless communications. According to an embodiment of the present disclosure, a method performed by a user equipment (UE) configured to operate in a wireless communication system comprises: identifying mapping information for one or more transmit/receive points (TRPs) associated with each of logical channels; receiving an uplink (UL) grant associated with a TRP among the TRPs; determining one or more logical channels associated with the TRP among the logical channels based on the mapping information; generating a media access control (MAC) protocol data unit (PDU) of the one or more logical channels associated with the TRP; and transmitting the MAC PDU via the TRP.

12 Claims, 12 Drawing Sheets

Identify mapping information for one or more TRPs associated with each of logical channels — S1001

Receive a UL grant associated with a TRP among the TRPs — S1003

Determine one or more logical channels associated with the TRP among the logical channels based on the mapping information — S1005

Generate a MAC PDU of the one or more logical channels associated with the TRP — S1007

Transmit the MAC PDU via the TRP
The UE may send the MAC PDU to network based on resources and information indicated by the UL grant and relevant configuration — S1009

(56)  References Cited

U.S. PATENT DOCUMENTS

| | | | |
|---|---|---|---|
| 2022/0061072 A1* | 2/2022 | Khoshnevisan | H04W 72/23 |
| 2022/0104187 A1* | 3/2022 | Zhou | H04W 72/0446 |
| 2022/0166564 A1* | 5/2022 | Babaei | H04W 76/15 |
| 2022/0295498 A1* | 9/2022 | Zhu | H04W 72/046 |
| 2022/0303055 A1* | 9/2022 | Wu | H04L 5/0053 |
| 2024/0224269 A1* | 7/2024 | Matsumura | H04W 72/21 |

* cited by examiner

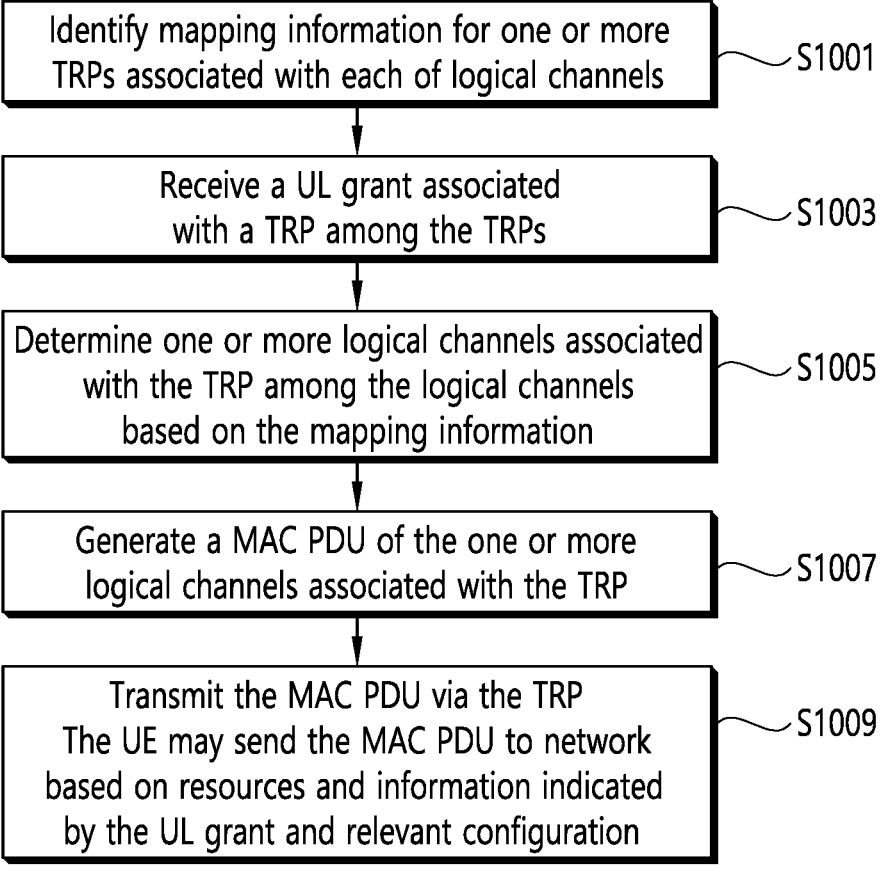

Identify mapping information for one or more
TRPs associated with each of logical channels — S1001

Receive a UL grant associated
with a TRP among the TRPs — S1003

Determine one or more logical channels associated
with the TRP among the logical channels
based on the mapping information — S1005

Generate a MAC PDU of the one or more
logical channels associated with the TRP — S1007

Transmit the MAC PDU via the TRP
The UE may send the MAC PDU to network
based on resources and information indicated
by the UL grant and relevant configuration — S1009

LOGICAL CHANNEL HANDLING IN WIRELESS COMMUNICATION SYSTEM

CROSS-REFERENCE TO RELATED APPLICATIONS

This application is the National Stage filing under 35 U.S.C. 371 of International Application No. PCT/KR2023/008451, filed on Jun. 19, 2023, which claims the benefit of U.S. Provisional Application No. 63/353,853, filed on Jun. 21, 2022, the contents of which are all hereby incorporated by reference herein in their entireties.

TECHNICAL FIELD

The present disclosure relates to logical channel handling in wireless communications.

BACKGROUND

3rd Generation Partnership Project (3GPP) Long-Term Evolution (LTE) is a technology for enabling high-speed packet communications. Many schemes have been proposed for the LTE objective including those that aim to reduce user and provider costs, improve service quality, and expand and improve coverage and system capacity. The 3GPP LTE requires reduced cost per bit, increased service availability, flexible use of a frequency band, a simple structure, an open interface, and adequate power consumption of a terminal as an upper-level requirement.

Work has started in International Telecommunication Union (ITU) and 3GPP to develop requirements and specifications for New Radio (NR) systems. 3GPP has to identify and develop the technology components needed for successfully standardizing the new RAT timely satisfying both the urgent market needs, and the more long-term requirements set forth by the ITU Radio communication sector (ITU-R) International Mobile Telecommunications (IMT)-2020 process. Further, the NR should be able to use any spectrum band ranging at least up to 100 GHz that may be made available for wireless communications even in a more distant future.

The NR targets a single technical framework addressing all usage scenarios, requirements and deployment scenarios including enhanced Mobile BroadBand (eMBB), massive Machine Type Communications (mMTC), Ultra-Reliable and Low Latency Communications (URLLC), etc. The NR shall be inherently forward compatible.

In wireless communications, multiple transmit/receive points (TRPs) may be used to utilize multiple transmission points for data transmission/reception. Different logical channels have different QoS requirements. Different TRPs may have different transmission capabilities, e.g., depending on its radio link status.

SUMMARY

An aspect of the present disclosure is to provide method and apparatus for logical channel handling in a wireless communication system.

Another aspect of the present disclosure is to provide method and apparatus for logical channel determination/prioritization in a wireless communication system.

Yet another aspect of the present disclosure is to provide method and apparatus for logical channel determination/prioritization associated with one or more TRPs in a wireless communication system.

According to an embodiment of the present disclosure, a method performed by a user equipment (UE) configured to operate in a wireless communication system comprises: identifying mapping information for one or more transmit/receive points (TRPs) associated with each of logical channels: receiving an uplink (UL) grant associated with a TRP among the TRPs: determining one or more logical channels associated with the TRP among the logical channels based on the mapping information: generating a media access control (MAC) protocol data unit (PDU) of the one or more logical channels associated with the TRP; and transmitting the MAC PDU via the TRP.

According to an embodiment of the present disclosure, a user equipment (UE) configured to operate in a wireless communication system comprises: at least one transceiver; at least one processor; and at least one memory operatively coupled to the at least one processor and storing instructions that, based on being executed by the at least one processor, perform operations comprising: identifying mapping information for one or more transmit/receive points (TRPs) associated with each of logical channels: receiving an uplink (UL) grant associated with a TRP among the TRPs: determining one or more logical channels associated with the TRP among the logical channels based on the mapping information: generating a media access control (MAC) protocol data unit (PDU) of the one or more logical channels associated with the TRP; and transmitting the MAC PDU via the TRP.

According to an embodiment of the present disclosure, a network node configured to operate in a wireless communication system comprises: at least one transceiver: at least one processor; and at least one memory operatively coupled to the at least one processor and storing instructions that, based on being executed by the at least one processor, perform operations comprising: transmitting, to a user equipment (UE), mapping information for one or more transmit/receive points (TRPs) associated with each of logical channels: transmitting, to the UE via a TRP among the TRPs, an uplink (UL) grant associated with the TRP; and receiving, from the UE via the TRP, a media access control (MAC) protocol data unit (PDU) of one or more logical channels associated with the TRP among the logical channels, wherein the one or more logical channels associated with the TRP is determined based on the mapping information.

According to an embodiment of the present disclosure, a method performed by a network node configured to operate in a wireless communication system comprises: transmitting, to a user equipment (UE), mapping information for one or more transmit/receive points (TRPs) associated with each of logical channels: transmitting, to the UE via a TRP among the TRPs, an uplink (UL) grant associated with the TRP; and receiving, from the UE via the TRP, a media access control (MAC) protocol data unit (PDU) of one or more logical channels associated with the TRP among the logical channels, wherein the one or more logical channels associated with the TRP is determined based on the mapping information.

According to an embodiment of the present disclosure, an apparatus adapted to operate in a wireless communication system comprises: at least processor; and at least one memory operatively coupled to the at least one processor and storing instructions that, based on being executed by the at least one processor, perform operations comprising: identifying mapping information for one or more transmit/receive points (TRPs) associated with each of logical channels: receiving an uplink (UL) grant associated with a TRP among the TRPs: determining one or more logical channels associated with the TRP among the logical channels based on the mapping information: generating a media access control (MAC) protocol data unit (PDU) of the one or more logical channels associated with the TRP; and transmitting the MAC PDU via the TRP.

According to an embodiment of the present disclosure, a non-transitory computer readable medium (CRM) has stored thereon a program code implementing instructions that, based on being executed by at least one processor, perform operations comprising: identifying mapping information for one or more transmit/receive points (TRPs) associated with each of logical channels: receiving an uplink (UL) grant associated with a TRP among the TRPs; determining one or more logical channels associated with the TRP among the logical channels based on the mapping information: generating a media access control (MAC) protocol data unit (PDU) of the one or more logical channels associated with the TRP; and transmitting the MAC PDU via the TRP.

According to an embodiment of the present disclosure, a method performed by a user equipment (UE) configured to operate in a wireless communication system comprises: receiving, from a network, a message comprising configurations for logical channels, wherein each of the configurations is related to a corresponding logical channel and comprises mapping information for one or more transmission reception points (TRPs) associated with the corresponding logical channel: receiving an uplink (UL) grant associated with a TRP among the TRPs: determining one or more logical channels associated with the TRP among the logical channels based on the mapping information: generating a media access control (MAC) protocol data unit (PDU) of the one or more logical channels associated with the TRP; and transmitting the MAC PDU via the TRP.

The present disclosure may have various advantageous effects.

For example, by transmitting data over a suitable TRP that can support QoS requirement, QoS of the data can be achieved.

Advantageous effects which can be obtained through specific embodiments of the present disclosure are not limited to the advantageous effects listed above. For example, there may be a variety of technical effects that a person having ordinary skill in the related art can understand and/or derive from the present disclosure. Accordingly, the specific effects of the present disclosure are not limited to those explicitly described herein, but may include various effects that may be understood or derived from the technical features of the present disclosure.

BRIEF DESCRIPTION OF THE DRAWINGS

FIG. 1 shows an example of a communication system to which implementations of the present disclosure is applied.

FIG. 10 shows an example of a method performed by a UE according to an embodiment of the present disclosure. The method may also be performed by a wireless device.

DETAILED DESCRIPTION

Figure 2:
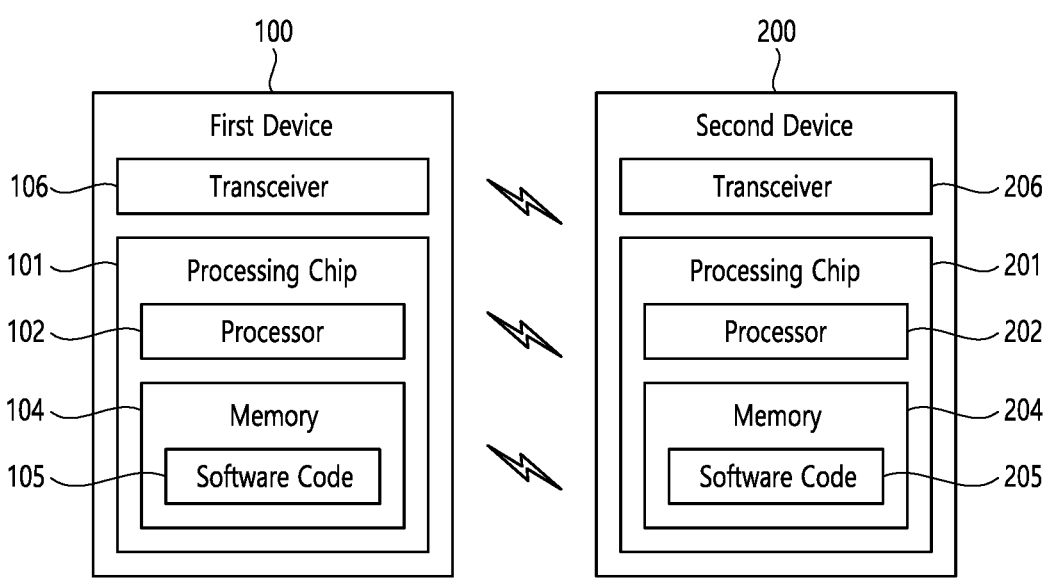
FIG. 2 shows an example of wireless devices to which implementations of the present disclosure is applied.

The following techniques, apparatuses, and systems may be applied to a variety of wireless multiple access systems. Examples of the multiple access systems include a Code Division Multiple Access (CDMA) system, a Frequency Division Multiple Access (FDMA) system, a Time Division Multiple Access (TDMA) system, an Orthogonal Frequency Division Multiple Access (OFDMA) system, a Single Carrier Frequency Division Multiple Access (SC-FDMA) system, and a Multi Carrier Frequency Division Multiple Access (MC-FDMA) system. CDMA may be embodied through radio technology such as Universal Terrestrial Radio Access (UTRA) or CDMA2000. TDMA may be embodied through radio technology such as Global System for Mobile communications (GSM). General Packet Radio Service (GPRS), or Enhanced Data rates for GSM Evolution (EDGE). OFDMA may be embodied through radio technology such as Institute of Electrical and Electronics Engineers (IEEE) 802.11 (Wi-Fi). IEEE 802.16 (WiMAX). IEEE 802.20, or Evolved UTRA (E-UTRA). UTRA is a part of a Universal Mobile Telecommunications System (UMTS). 3rd Generation Partnership Project (3GPP) Long-Term Evolution (LTE) is a part of Evolved UMTS (E-UMTS) using E-UTRA. 3GPP LTE employs OFDMA in downlink (DL) and SC-FDMA in uplink (UL). Evolution of 3GPP LTE includes LTE-Advanced (LTE-A). LTE-A Pro, and/or 5G New Radio (NR).

For convenience of description, implementations of the present disclosure are mainly described in regards to a 3GPP based wireless communication system. However, the technical features of the present disclosure are not limited thereto. For example, although the following detailed description is given based on a mobile communication system corresponding to a 3GPP based wireless communication system, aspects of the present disclosure that are not limited to 3GPP based wireless communication system are applicable to other mobile communication systems.

For terms and technologies which are not specifically described among the terms of and technologies employed in the present disclosure, the wireless communication standard documents published before the present disclosure may be referenced.

In the present disclosure. "A or B" may mean "only A", "only B", or "both A and B". In other words, "A or B" in the present disclosure may be interpreted as "A and/or B". For example, "A, B or C" in the present disclosure may mean "only A", "only B", "only C", or "any combination of A, B and C".

In the present disclosure, slash (/) or comma (,) may mean "and/or". For example, "A/B" may mean "A and/or B".

Accordingly, "A/B" may mean "only A", "only B", or "both A and B". For example, "A, B, C" may mean "A, B or C".

In the present disclosure, "at least one of A and B" may mean "only A", "only B" or "both A and B". In addition, the expression "at least one of A or B" or "at least one of A and/or B" in the present disclosure may be interpreted as same as "at least one of A and B".

In addition, in the present disclosure, "at least one of A, B and C" may mean "only A", "only B", "only C", or "any combination of A, B and C". In addition, "at least one of A, B or C" or "at least one of A, B and/or C" may mean "at least one of A, B and C".

Also, parentheses used in the present disclosure may mean "for example". In detail, when it is shown as "control information (PDCCH)", "PDCCH" may be proposed as an example of "control information". In other words, "control information" in the present disclosure is not limited to "PDCCH", and "PDCCH" may be proposed as an example of "control information". In addition, even when shown as "control information (i.e., PDCCH)", "PDCCH" may be proposed as an example of "control information".

Technical features that are separately described in one drawing in the present disclosure may be implemented separately or simultaneously.

Although not limited thereto, various descriptions, functions, procedures, suggestions, methods and/or operational flowcharts of the present disclosure disclosed herein can be applied to various fields requiring wireless communication and/or connection (e.g., 5G) between devices.

Hereinafter, the present disclosure will be described in more detail with reference to drawings. The same reference numerals in the following drawings and/or descriptions may refer to the same and/or corresponding hardware blocks, software blocks, and/or functional blocks unless otherwise indicated.

Figure 1:
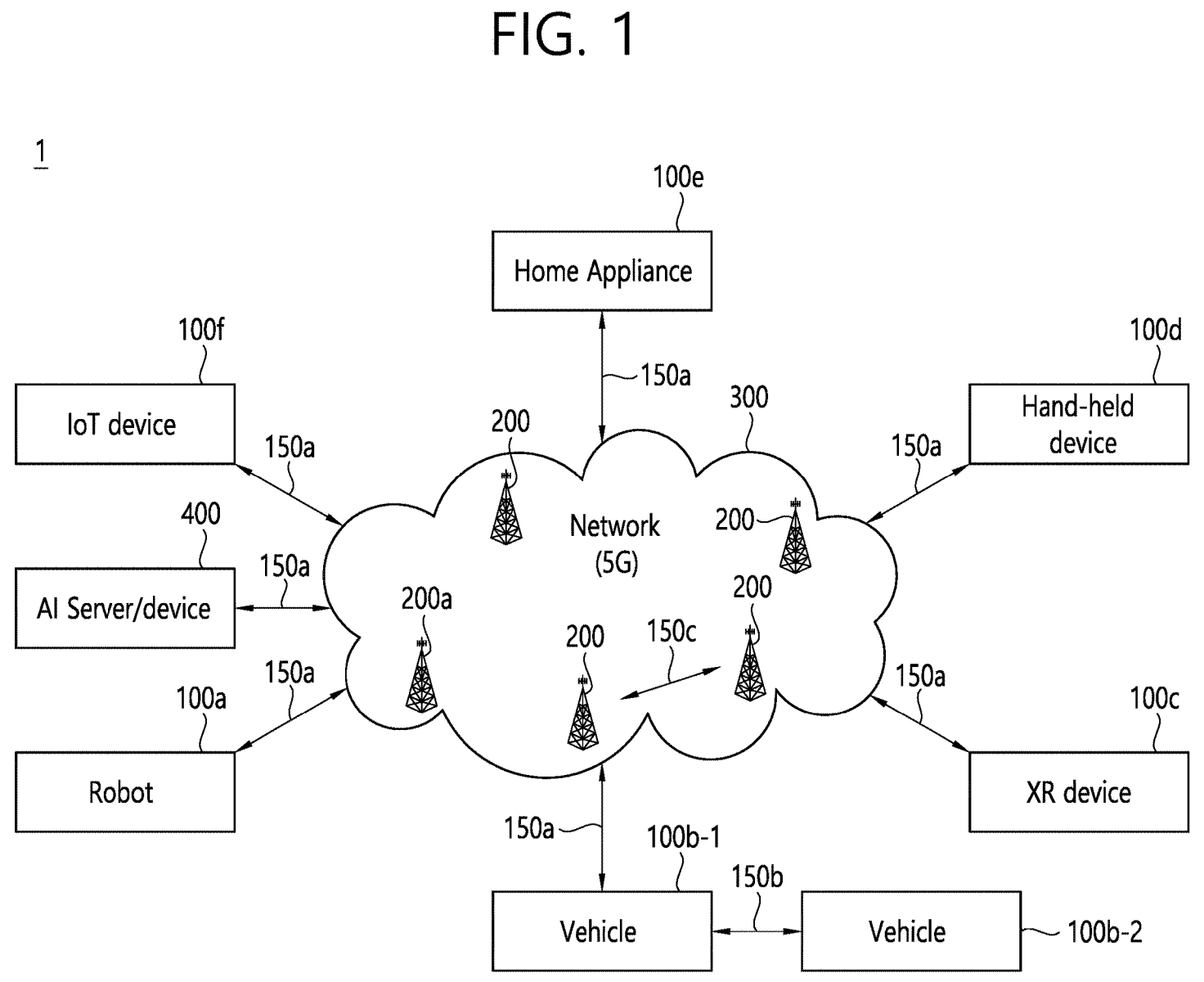

FIG. 1 shows an example of a communication system to which implementations of the present disclosure is applied.

The 5G usage scenarios shown in FIG. 1 are only exemplary, and the technical features of the present disclosure can be applied to other 5G usage scenarios which are not shown in FIG. 1.

Three main requirement categories for 5G include (1) a category of enhanced Mobile BroadBand (eMBB), (2) a category of massive Machine Type Communication (mMTC), and (3) a category of Ultra-Reliable and Low Latency Communications (URLLC).

Referring to FIG. 1, the communication system 1 includes wireless devices 100a to 100f, Base Stations (BSs) 200, and a network 300. Although FIG. 1 illustrates a 5G network as an example of the network of the communication system 1, the implementations of the present disclosure are not limited to the 5G system, and can be applied to the future communication system beyond the 5G system.

The BSs 200 and the network 300 may be implemented as wireless devices and a specific wireless device may operate as a BS/network node with respect to other wireless devices.

The wireless devices 100a to 100f represent devices performing communication using Radio Access Technology (RAT) (e.g., 5G NR or LTE) and may be referred to as communication/radio/5G devices. The wireless devices 100a to 100f may include, without being limited to, a robot 100a, vehicles 100b-1 and 100b-2, an extended Reality (XR) device 100c, a hand-held device 100d, a home appliance 100e, an Internet-of-Things (IoT) device 100f, and an Artificial Intelligence (AI) device/server 400. For example, the vehicles may include a vehicle having a wireless communication function, an autonomous driving vehicle, and a vehicle capable of performing communication between vehicles. The vehicles may include an Unmanned Aerial Vehicle (UAV) (e.g., a drone). The XR device may include an Augmented Reality (AR)/Virtual Reality (VR)/Mixed Reality (MR) device and may be implemented in the form of a Head-Mounted Device (HMD), a Head-Up Display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter.

In the present disclosure, the wireless devices 100a to 100f may be called User Equipments (UEs). A UE may include, for example, a cellular phone, a smartphone, a laptop computer, a digital broadcast terminal, a Personal Digital Assistant (PDA), a Portable Multimedia Player (PMP), a navigation system, a slate Personal Computer (PC), a tablet PC, an ultrabook, a vehicle, a vehicle having an autonomous traveling function, a connected car, an UAV, an AI module, a robot, an AR device, a VR device, an MR device, a hologram device, a public safety device, an MTC device, an IoT device, a medical device, a FinTech device (or a financial device), a security device, a weather/environment device, a device related to a 5G service, or a device related to a fourth industrial revolution field.

The wireless devices 100a to 100f may be connected to the network 300 via the BSs 200. An AI technology may be applied to the wireless devices 100a to 100f and the wireless devices 100a to 100f may be connected to the AI server 400 via the network 300. The network 300 may be configured using a 3G network, a 4G (e.g., LTE) network, a 5G (e.g., NR) network, and a beyond-5G network. Although the wireless devices 100a to 100f may communicate with each other through the BSs 200/network 300, the wireless devices 100a to 100f may perform direct communication (e.g., sidelink communication) with each other without passing through the BSs 200/network 300. For example, the vehicles 100b-1 and 100b-2 may perform direct communication (e.g., Vehicle-to-Vehicle (V2V)/Vehicle-to-everything (V2X) communication). The IoT device (e.g., a sensor) may perform direct communication with other IoT devices (e.g., sensors) or other wireless devices 100a to 100f.

Wireless communication/connections 150a, 150b and 150c may be established between the wireless devices 100a to 100f and/or between wireless device 100a to 100f and BS 200 and/or between BSs 200. Herein, the wireless communication/connections may be established through various RATs (e.g., 5G NR) such as uplink/downlink communication 150a, sidelink communication (or Device-to-Device (D2D) communication) 150b, inter-base station communication 150c (e.g., relay, Integrated Access and Backhaul (IAB)), etc. The wireless devices 100a to 100f and the BSs 200/the wireless devices 100a to 100f may transmit/receive radio signals to/from each other through the wireless communication/connections 150a, 150b and 150c. For example, the wireless communication/connections 150a, 150b and 150c may transmit/receive signals through various physical channels. To this end, at least a part of various configuration information configuring processes, various signal processing processes (e.g., channel encoding/decoding, modulation/demodulation, and resource mapping/de-mapping), and resource allocating processes, for transmitting/receiving radio signals, may be performed based on the various proposals of the present disclosure.

NR supports multiples numerologies (and/or multiple Sub-Carrier Spacings (SCS)) to support various 5G services. For example, if SCS is 15 kHz, wide area can be supported in traditional cellular bands, and if SCS is 30 kHz/60 kHz, dense-urban, lower latency, and wider carrier bandwidth can be supported. If SCS is 60 kHz or higher, bandwidths greater than 24.25 GHz can be supported to overcome phase noise.

The NR frequency band may be defined as two types of frequency range, i.e., Frequency Range 1 (FR1) and Frequency Range 2 (FR2). The numerical value of the frequency range may be changed. For example, the frequency ranges of the two types (FR1 and FR2) may be as shown in Table 1 below. For ease of explanation, in the frequency ranges used in the NR system, FR1 may mean "sub 6 GHz range". FR2 may mean "above 6 GHz range," and may be referred to as millimeter Wave (mmW).

TABLE 1

| Frequency Range designation | Corresponding frequency range | Subcarrier Spacing |
|---|---|---|
| FR1 | 450 MHz-6000 MHz | 15, 30, 60 kHz |
| FR2 | 24250 MHz-52600 MHz | 60, 120, 240 kHz |

As mentioned above, the numerical value of the frequency range of the NR system may be changed. For example, FR1 may include a frequency band of 410 MHz to 7125 MHz as shown in Table 2 below. That is, FR1 may include a frequency band of 6 GHz (or 5850, 5900, 5925 MHZ, etc.) or more. For example, a frequency band of 6 GHz (or 5850, 5900, 5925 MHZ, etc.) or more included in FR1 may include an unlicensed band. Unlicensed bands may be used for a variety of purposes, for example for communication for vehicles (e.g., autonomous driving).

TABLE 2

| Frequency Range designation | Corresponding frequency range | Subcarrier Spacing |
|---|---|---|
| FR1 | 410 MHz-7125 MHz | 15, 30, 60 kHz |
| FR2 | 24250 MHz-52600 MHz | 60, 120, 240 kHz |

Here, the radio communication technologies implemented in the wireless devices in the present disclosure may include Narrow Band IoT (NB-IoT) technology for low-power communication as well as LTE, NR and 6G. For example, NB-IoT technology may be an example of Low Power Wide Area Network (LPWAN) technology, may be implemented in specifications such as LTE Cat NB1 and/or LTE Cat NB2, and may not be limited to the above-mentioned names. Additionally and/or alternatively, the radio communication technologies implemented in the wireless devices in the present disclosure may communicate based on LTE-M technology. For example, LTE-M technology may be an example of LPWAN technology and be called by various names such as enhanced MTC (eMTC). For example, LTE-M technology may be implemented in at least one of the various specifications, such as 1) LTE Cat 0, 2) LTE Cat M1, 3) LTE Cat M2, 4) LTE non-bandwidth limited (non-BL), 5) LTE-MTC, 6) LTE Machine Type Communication, and/or 7) LTE M, and may not be limited to the above-mentioned names. Additionally and/or alternatively, the radio communication technologies implemented in the wireless devices in the present disclosure may include at least one of ZigBee, Bluetooth, and/or LPWAN which take into account low-power communication, and may not be limited to the above-mentioned names. For example, ZigBee technology may generate Personal Area Networks (PANs) associated with small/low-power digital communication based on various specifications such as IEEE 802.15.4 and may be called various names. FIG. 2 shows an example of wireless devices to which implementations of the present disclosure is applied.

In FIG. 2, The first wireless device 100 and/or the second wireless device 200 may be implemented in various forms according to use cases/services. For example, {the first wireless device 100 and the second wireless device 200} may correspond to at least one of {the wireless device 100*a* to 100*f* and the BS 200}, {the wireless device 100*a* to 100*f* and the wireless device 100*a* to 100*f*} and/or {the BS 200 and the BS 200} of FIG. 1. The first wireless device 100 and/or the second wireless device 200 may be configured by various elements, devices/parts, and/or modules.

The first wireless device 100 may include at least one transceiver, such as a transceiver 106, at least one processing chip, such as a processing chip 101, and/or one or more antennas 108.

The processing chip 101 may include at least one processor, such a processor 102, and at least one memory, such as a memory 104. Additional and/or alternatively, the memory 104 may be placed outside of the processing chip 101.

The processor 102 may control the memory 104 and/or the transceiver 106 and may be adapted to implement the descriptions, functions, procedures, suggestions, methods and/or operational flowcharts described in the present disclosure. For example, the processor 102 may process information within the memory 104 to generate first information/signals and then transmit radio signals including the first information/signals through the transceiver 106. The processor 102 may receive radio signals including second information/signals through the transceiver 106 and then store information obtained by processing the second information/signals in the memory 104.

The memory 104 may be operably connectable to the processor 102. The memory 104 may store various types of information and/or instructions. The memory 104 may store a firmware and/or a software code 105 which implements codes, commands, and/or a set of commands that, when executed by the processor 102, perform the descriptions, functions, procedures, suggestions, methods and/or operational flowcharts disclosed in the present disclosure. For example, the firmware and/or the software code 105 may implement instructions that, when executed by the processor 102, perform the descriptions, functions, procedures, suggestions, methods and/or operational flowcharts disclosed in the present disclosure. For example, the firmware and/or the software code 105 may control the processor 102 to perform one or more protocols. For example, the firmware and/or the software code 105 may control the processor 102 to perform one or more layers of the radio interface protocol.

Herein, the processor 102 and the memory 104 may be a part of a communication modem/circuit/chip designed to implement RAT (e.g., LTE or NR). The transceiver 106 may be connected to the processor 102 and transmit and/or receive radio signals through one or more antennas 108. Each of the transceiver 106 may include a transmitter and/or a receiver. The transceiver 106 may be interchangeably used with Radio Frequency (RF) unit(s). In the present disclosure, the first wireless device 100 may represent a communication modem/circuit/chip.

The second wireless device 200 may include at least one transceiver, such as a transceiver 206, at least one processing chip, such as a processing chip 201, and/or one or more antennas 208.

The processing chip 201 may include at least one processor, such a processor 202, and at least one memory, such as a memory 204. Additional and/or alternatively, the memory 204 may be placed outside of the processing chip 201.

The processor 202 may control the memory 204 and/or the transceiver 206 and may be adapted to implement the descriptions, functions, procedures, suggestions, methods and/or operational flowcharts described in the present disclosure. For example, the processor 202 may process information within the memory 204 to generate third information/signals and then transmit radio signals including the third information/signals through the transceiver 206. The processor 202 may receive radio signals including fourth information/signals through the transceiver 106 and then store information obtained by processing the fourth information/signals in the memory 204.

The memory 204 may be operably connectable to the processor 202. The memory 204 may store various types of information and/or instructions. The memory 204 may store a firmware and/or a software code 205 which implements codes, commands, and/or a set of commands that, when executed by the processor 202, perform the descriptions, functions, procedures, suggestions, methods and/or operational flowcharts disclosed in the present disclosure. For example, the firmware and/or the software code 205 may implement instructions that, when executed by the processor 202, perform the descriptions, functions, procedures, suggestions, methods and/or operational flowcharts disclosed in the present disclosure. For example, the firmware and/or the software code 205 may control the processor 202 to perform one or more protocols. For example, the firmware and/or the software code 205 may control the processor 202 to perform one or more layers of the radio interface protocol.

Herein, the processor 202 and the memory 204 may be a part of a communication modem/circuit/chip designed to implement RAT (e.g., LTE or NR). The transceiver 206 may be connected to the processor 202 and transmit and/or receive radio signals through one or more antennas 208. Each of the transceiver 206 may include a transmitter and/or a receiver. The transceiver 206 may be interchangeably used with RF unit. In the present disclosure, the second wireless device 200 may represent a communication modem/circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as Physical (PHY) layer. Media Access Control (MAC) layer. Radio Link Control (RLC) layer. Packet Data Convergence Protocol (PDCP) layer. Radio Resource Control (RRC) layer, and Service Data Adaptation Protocol (SDAP) layer). The one or more processors 102 and 202 may generate one or more Protocol Data Units (PDUs), one or more Service Data Unit (SDUs), messages, control information, data, or information according to the descriptions, functions, procedures, suggestions, methods and/or operational flowcharts disclosed in the present disclosure. The one or more processors 102 and 202 may generate signals (e.g., baseband signals) including PDUs, SDUs, messages, control information, data, or information according to the descriptions, functions, procedures, suggestions, methods and/or operational flowcharts disclosed in the present disclosure and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, suggestions, methods and/or operational flowcharts disclosed in the present disclosure.

The one or more processors 102 and 202 may be referred to as controllers, microcontrollers, microprocessors, or microcomputers. The one or more processors 102 and 202 may be implemented by hardware, firmware, software, or a combination thereof. As an example, one or more Application Specific Integrated Circuits (ASICs), one or more Digital Signal Processors (DSPs), one or more Digital Signal Processing Devices (DSPDs), one or more Programmable Logic Devices (PLDs), or one or more Field Programmable Gate Arrays (FPGAs) may be included in the one or more processors 102 and 202. For example, the one or more processors 102 and 202 may be configured by a set of a communication control processor, an Application Processor (AP), an Electronic Control Unit (ECU), a Central Processing Unit (CPU), a Graphic Processing Unit (GPU), and a memory control processor.

The one or more memories 104 and 204 may be connected to the one or more processors 102 and 202 and store various types of data, signals, messages, information, programs, code, instructions, and/or commands. The one or more memories 104 and 204 may be configured by Random Access Memory (RAM), Dynamic RAM (DRAM), Read-Only Memory (ROM), electrically Erasable Programmable Read-Only Memory (EPROM), flash memory, volatile memory, non-volatile memory, hard drive, register, cash memory, computer-readable storage medium, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the descriptions, functions, procedures, suggestions, methods and/or operational flowcharts disclosed in the present disclosure, to one or more other devices. The one or more transceivers 106 and 206 may receive user data, control information, and/or radio signals/channels, mentioned in the descriptions, functions, procedures, suggestions, methods and/or operational flowcharts disclosed in the present disclosure, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices.

The one or more transceivers 106 and 206 may be connected to the one or more antennas 108 and 208. Additionally and/or alternatively, the one or more transceivers 106 and 206 may include one or more antennas 108 and 208. The one or more transceivers 106 and 206 may be adapted to transmit and receive user data, control information, and/or radio signals/channels, mentioned in the descriptions, functions, procedures, suggestions, methods and/or operational flowcharts disclosed in the present disclosure, through the one or more antennas 108 and 208. In the present disclosure, the one or more antennas 108 and 208 may be a plurality of physical antennas or a plurality of logical antennas (e.g., antenna ports).

The one or more transceivers 106 and 206 may convert received user data, control information, radio signals/channels, etc., from RF band signals into baseband signals in order to process received user data, control information, radio signals/channels, etc., using the one or more processors 102 and 202. The one or more transceivers 106 and 206 may convert the user data, control information, radio signals/channels, etc., processed using the one or more processors 102 and 202 from the base band signals into the RF band signals. To this end, the one or more transceivers 106 and 206 may include (analog) oscillators and/or filters. For example, the one or more transceivers 106 and 206 can up-convert OFDM baseband signals to OFDM signals by their (analog) oscillators and/or filters under the control of the one or more processors 102 and 202 and transmit the up-converted OFDM signals at the carrier frequency. The one or more transceivers 106 and 206 may receive OFDM signals at a carrier frequency and down-convert the OFDM signals into OFDM baseband signals by their (analog) oscillators and/or filters under the control of the one or more processors 102 and 202.

Although not shown in FIG. 2, the wireless devices 100 and 200 may further include additional components. The additional components 140 may be variously configured according to types of the wireless devices 100 and 200. For example, the additional components 140 may include at least one of a power unit/battery, an Input/Output (I/O) device (e.g., audio I/O port, video I/O port), a driving device, and a computing device. The additional components 140 may be coupled to the one or more processors 102 and 202 via various technologies, such as a wired or wireless connection.

In the implementations of the present disclosure, a UE may operate as a transmitting device in Uplink (UL) and as a receiving device in Downlink (DL). In the implementations of the present disclosure, a BS may operate as a receiving device in UL and as a transmitting device in DL. Hereinafter, for convenience of description, it is mainly assumed that the first wireless device 100 acts as the UE, and the second wireless device 200 acts as the BS. For example, the processor(s) 102 connected to, mounted on or launched in the first wireless device 100 may be adapted to perform the UE behavior according to an implementation of the present disclosure or control the transceiver(s) 106 to perform the UE behavior according to an implementation of the present disclosure. The processor(s) 202 connected to, mounted on or launched in the second wireless device 200 may be adapted to perform the BS behavior according to an implementation of the present disclosure or control the transceiver(s) 206 to perform the BS behavior according to an implementation of the present disclosure.

In the present disclosure, a BS is also referred to as a node B (NB), an eNode B (eNB), or a gNB.

Figure 3:
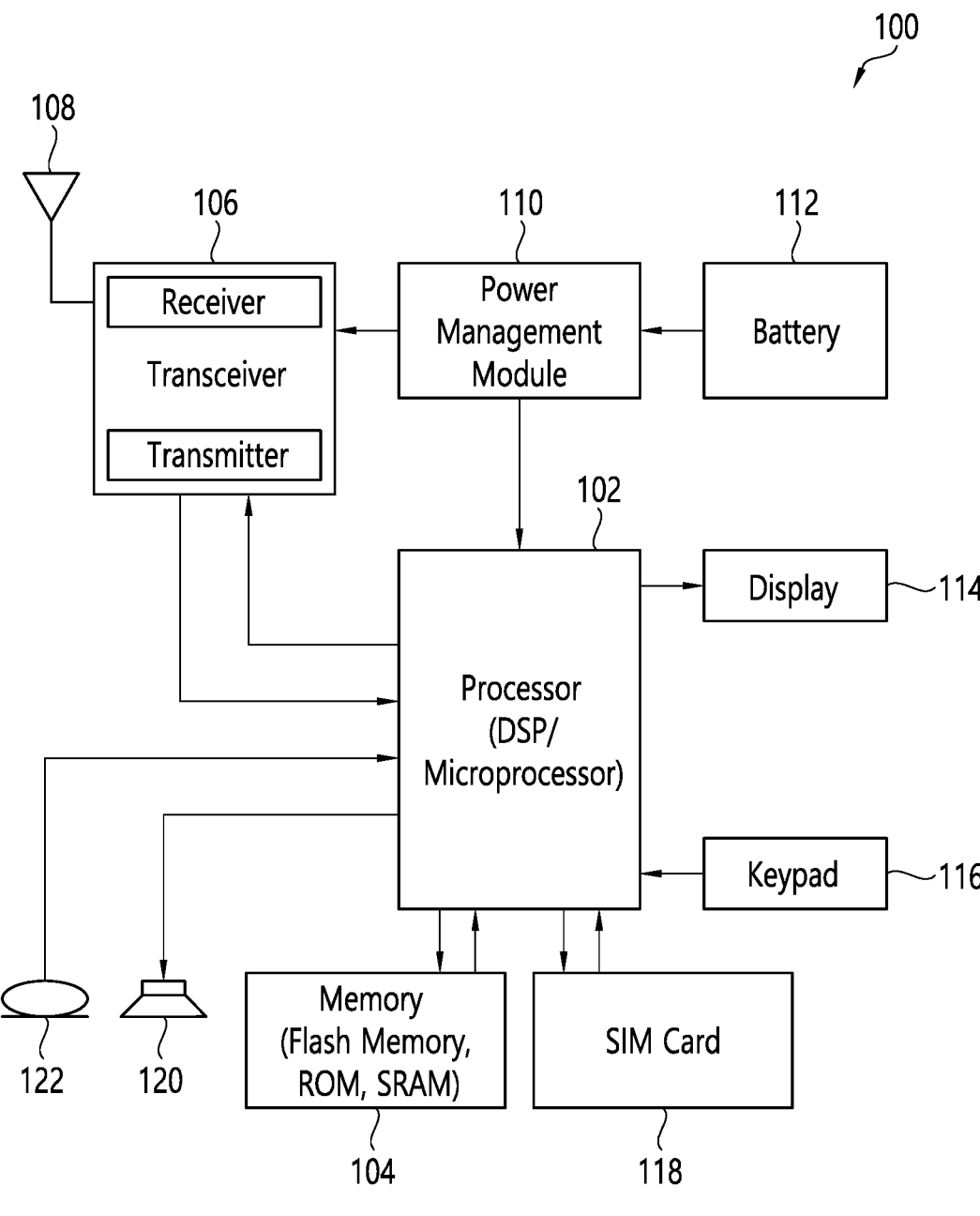
FIG. 3 shows an example of UE to which implementations of the present disclosure is applied.

FIG. 3 shows an example of UE to which implementations of the present disclosure is applied.

Referring to FIG. 3, a UE 100 may correspond to the first wireless device 100 of FIG. 2.

A UE 100 includes a processor 102, a memory 104, a transceiver 106, one or more antennas 108, a power management module 141, a battery 142, a display 143, a keypad 144, a Subscriber Identification Module (SIM) card 145, a speaker 146, and a microphone 147.

The processor 102 may be adapted to implement the descriptions, functions, procedures, suggestions, methods and/or operational flowcharts disclosed in the present disclosure. The processor 102 may be adapted to control one or more other components of the UE 100 to implement the descriptions, functions, procedures, suggestions, methods and/or operational flowcharts disclosed in the present disclosure. Layers of the radio interface protocol may be implemented in the processor 102. The processor 102 may include ASIC, other chipset, logic circuit and/or data processing device. The processor 102 may be an application processor. The processor 102 may include at least one of DSP, CPU, GPU, a modem (modulator and demodulator). An example of the processor 102 may be found in SNAPDRAGON™ series of processors made by Qualcomm®, EXYNOS™ series of processors made by Samsung®, A series of processors made by Apple®, HELIO™ series of processors made by MediaTek®, ATOM™ series of processors made by Intel® or a corresponding next generation processor.

The memory 104 is operatively coupled with the processor 102 and stores a variety of information to operate the processor 102. The memory 104 may include ROM, RAM, flash memory, memory card, storage medium and/or other storage device. When the embodiments are implemented in software, the techniques described herein can be implemented with modules (e.g., procedures, functions, etc.) that perform the descriptions, functions, procedures, suggestions, methods and/or operational flowcharts disclosed in the present disclosure. The modules can be stored in the memory 104 and executed by the processor 102. The memory 104 can be implemented within the processor 102 or external to the processor 102 in which case those can be communicatively coupled to the processor 102 via various means as is known in the art.

The transceiver 106 is operatively coupled with the processor 102, and transmits and/or receives a radio signal. The transceiver 106 includes a transmitter and a receiver. The transceiver 106 may include baseband circuitry to process radio frequency signals. The transceiver 106 controls the one or more antennas 108 to transmit and/or receive a radio signal.

The power management module 141 manages power for the processor 102 and/or the transceiver 106. The battery 142 supplies power to the power management module 141.

The display 143 outputs results processed by the processor 102. The keypad 144 receives inputs to be used by the processor 102. The keypad 144 may be shown on the display 143.

The SIM card 145 is an integrated circuit that is intended to securely store the International Mobile Subscriber Identity (IMSI) number and its related key, which are used to identify and authenticate subscribers on mobile telephony devices (such as mobile phones and computers). It is also possible to store contact information on many SIM cards.

The speaker 146 outputs sound-related results processed by the processor 102. The microphone 147 receives sound-related inputs to be used by the processor 102.

Figure 4:
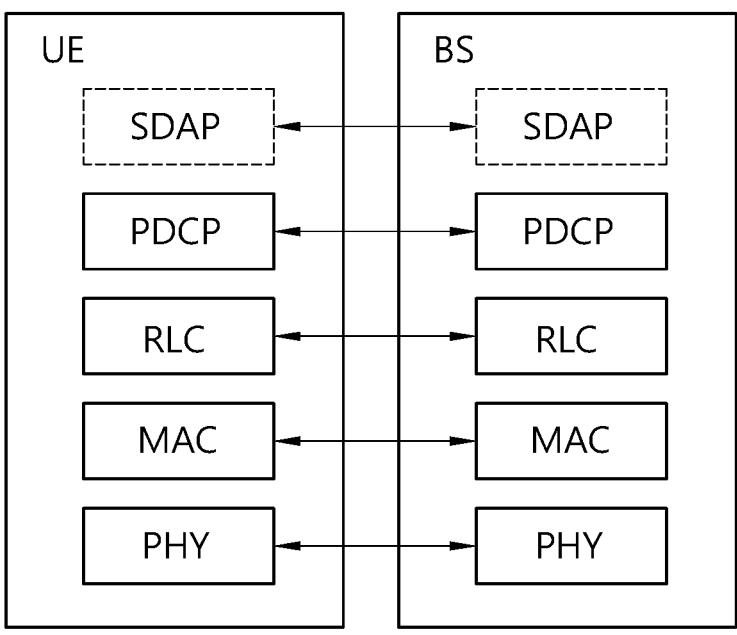
FIGS. 4 and 5 show an example of protocol stacks in a 3GPP based wireless communication system to which implementations of the present disclosure is applied.
Figure 5:
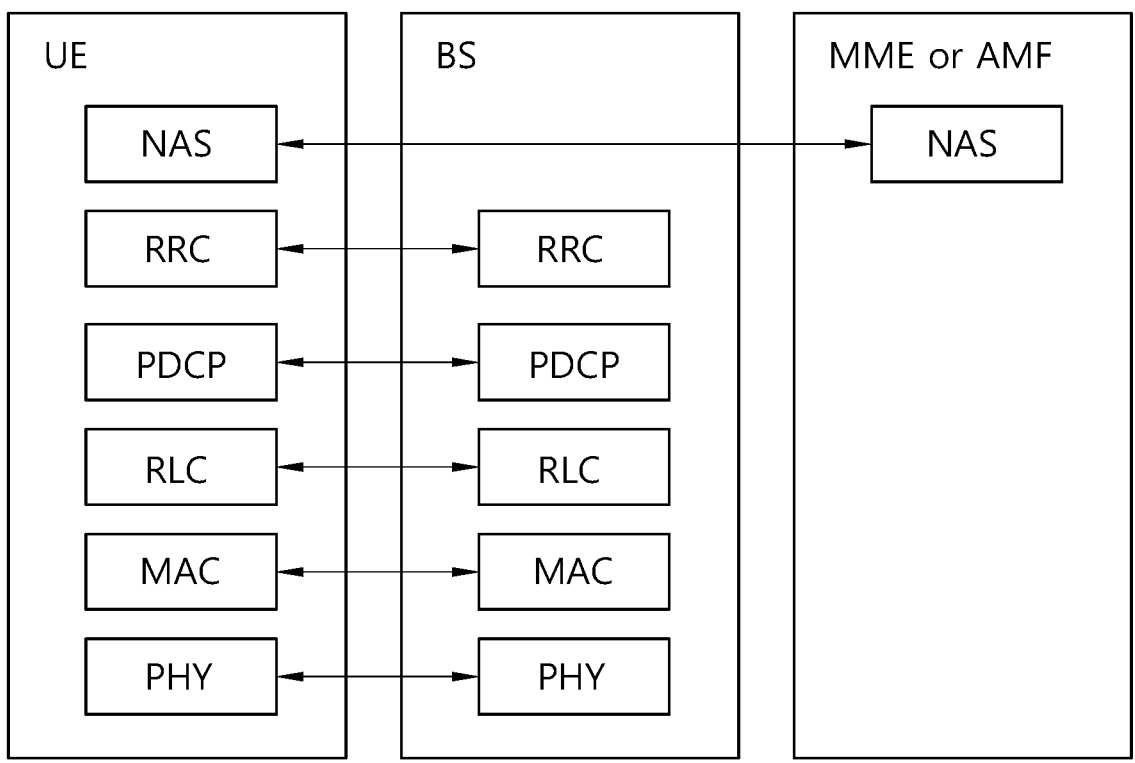

FIGS. 4 and 5 show an example of protocol stacks in a 3GPP based wireless communication system to which implementations of the present disclosure is applied.

In particular. FIG. 4 illustrates an example of a radio interface user plane protocol stack between a UE and a BS and FIG. 5 illustrates an example of a radio interface control plane protocol stack between a UE and a BS. The control plane refers to a path through which control messages used to manage call by a UE and a network are transported. The user plane refers to a path through which data generated in an application layer, for example, voice data or Internet packet data are transported. Referring to FIG. 4, the user plane protocol stack may be divided into Layer 1 (i.e., a PHY layer) and Layer 2. Referring to FIG. 5, the control plane protocol stack may be divided into Layer 1 (i.e., a PHY layer), Layer 2, Layer 3 (e.g., an RRC layer), and a non-access stratum (NAS) layer. Layer 1, Layer 2 and Layer 3 are referred to as an access stratum (AS).

In the 3GPP LTE system, the Layer 2 is split into the following sublayers: MAC, RLC, and PDCP. In the 3GPP NR system, the Layer 2 is split into the following sublayers: MAC, RLC, PDCP and SDAP. The PHY layer offers to the MAC sublayer transport channels, the MAC sublayer offers to the RLC sublayer logical channels, the RLC sublayer offers to the PDCP sublayer RLC channels, the PDCP sublayer offers to the SDAP sublayer radio bearers. The SDAP sublayer offers to 5G core network quality of service (QOS) flows.

In the 3GPP NR system, the main services and functions of the MAC sublayer include: mapping between logical channels and transport channels; multiplexing/de-multiplexing of MAC SDUs belonging to one or different logical channels into/from transport blocks (TB) delivered to/from the physical layer on transport channels; scheduling information reporting; error correction through hybrid automatic repeat request (HARQ) (one HARQ entity per cell in case of carrier aggregation (CA)); priority handling between UEs by means of dynamic scheduling; priority handling between logical channels of one UE by means of logical channel prioritization; padding. A single MAC entity may support multiple numerologies, transmission timings and cells. Mapping restrictions in logical channel prioritization control which numerology(ies), cell(s), and transmission timing(s) a logical channel can use.

Different kinds of data transfer services are offered by MAC. To accommodate different kinds of data transfer services, multiple types of logical channels are defined, i.e., each supporting transfer of a particular type of information. Each logical channel type is defined by what type of information is transferred. Logical channels are classified into two groups: control channels and traffic channels. Control channels are used for the transfer of control plane information only, and traffic channels are used for the transfer of user plane information only. Broadcast control channel (BCCH) is a downlink logical channel for broadcasting system control information, paging control channel (PCCH) is a downlink logical channel that transfers paging information system information change notifications and indications of ongoing public warning service (PWS) broadcasts, common control channel (CCCH) is a logical channel for transmitting control information between UEs and network and used for UEs having no RRC connection with the network, and dedicated control channel (DCCH) is a point-to-point bi-directional logical channel that transmits dedicated control information between a UE and the network and used by UEs having an RRC connection. Dedicated traffic channel (DTCH) is a point-to-point logical channel, dedicated to one UE, for the transfer of user information. A DTCH can exist in both uplink and downlink. In downlink, the following connections between logical channels and transport channels exist; BCCH can be mapped to broadcast channel (BCH); BCCH can be mapped to downlink shared channel (DL-SCH); PCCH can be mapped to paging channel (PCH); CCCH can be mapped to DL-SCH; DCCH can be mapped to DL-SCH; and DTCH can be mapped to DL-SCH. In uplink, the following connections between logical channels and transport channels exist: CCCH can be mapped to uplink shared channel (UL-SCH); DCCH can be mapped to UL-SCH; and DTCH can be mapped to UL-SCH.

The RLC sublayer supports three transmission modes: transparent mode (TM), unacknowledged mode (UM), and acknowledged node (AM). The RLC configuration is per logical channel with no dependency on numerologies and/or transmission durations. In the 3GPP NR system, the main services and functions of the RLC sublayer depend on the transmission mode and include: transfer of upper layer PDUs: sequence numbering independent of the one in PDCP (UM and AM): error correction through ARQ (AM only); segmentation (AM and UM) and re-segmentation (AM only) of RLC SDUs: reassembly of SDU (AM and UM): duplicate detection (AM only): RLC SDU discard (AM and UM); RLC re-establishment: protocol error detection (AM only).

In the 3GPP NR system, the main services and functions of the PDCP sublayer for the user plane include: sequence numbering: header compression and decompression using robust header compression (ROHC); transfer of user data; reordering and duplicate detection; in-order delivery; PDCP PDU routing (in case of split bearers); retransmission of PDCP SDUs; ciphering, deciphering and integrity protection; PDCP SDU discard; PDCP re-establishment and data recovery for RLC AM; PDCP status reporting for RLC AM; duplication of PDCP PDUs and duplicate discard indication to lower layers. The main services and functions of the PDCP sublayer for the control plane include: sequence numbering; ciphering, deciphering and integrity protection; transfer of control plane data; reordering and duplicate detection; in-order delivery; duplication of PDCP PDUs and duplicate discard indication to lower layers.

In the 3GPP NR system, the main services and functions of SDAP include: mapping between a QoS flow and a data radio bearer; marking QoS flow ID (QFI) in both DL and UL packets. A single protocol entity of SDAP is configured for each individual PDU session.

In the 3GPP NR system, the main services and functions of the RRC sublayer include: broadcast of system information related to AS and NAS; paging initiated by 5GC or NG-RAN; establishment, maintenance and release of an RRC connection between the UE and NG-RAN; security functions including key management; establishment, configuration, maintenance and release of signaling radio bearers (SRBs) and data radio bearers (DRBs); mobility functions (including: handover and context transfer. UE cell selection and reselection and control of cell selection and reselection, inter-RAT mobility); QoS management functions; UE measurement reporting and control of the reporting; detection of and recovery from radio link failure; NAS message transfer to/from NAS from/to UE.

Figure 6:
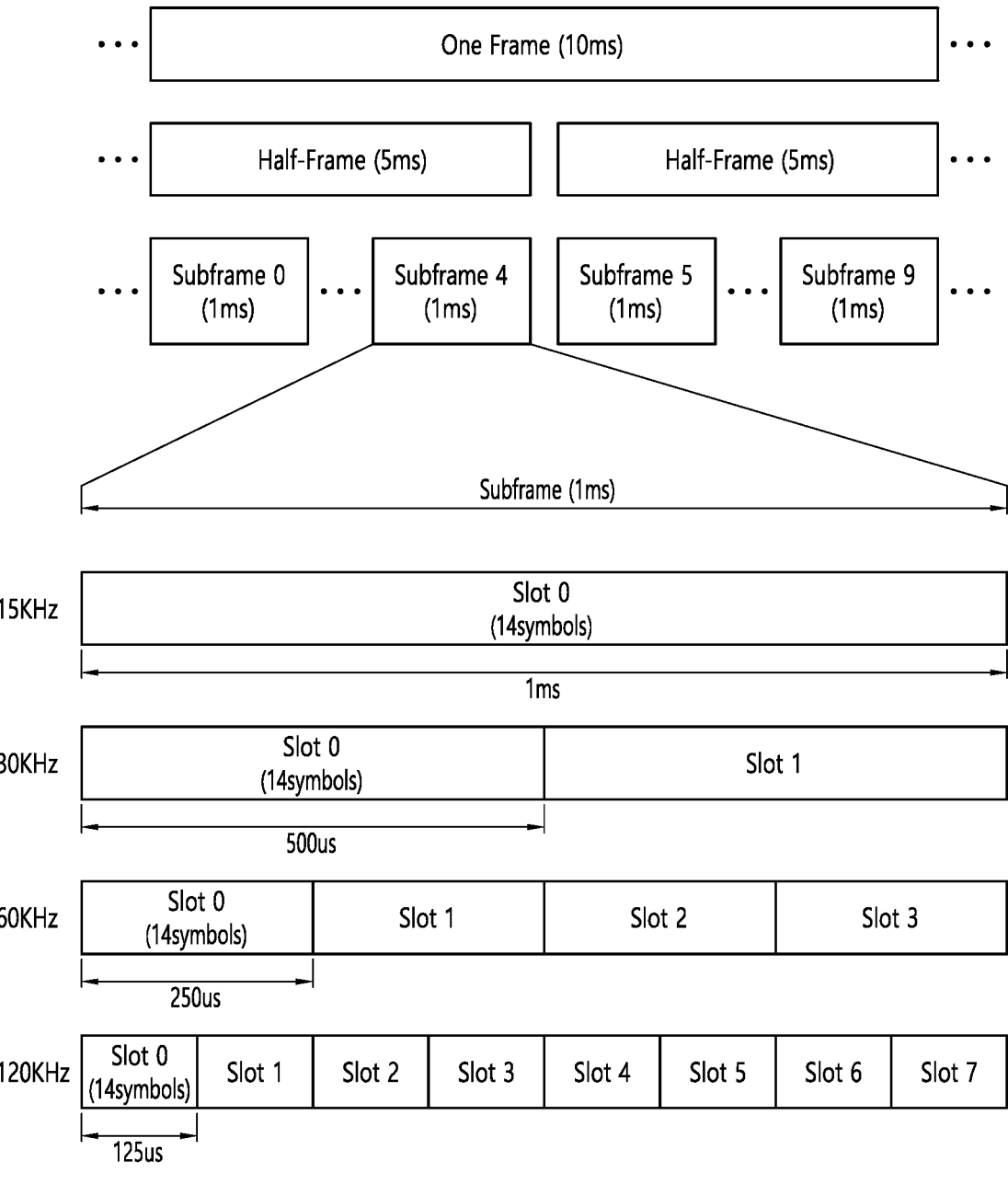
FIG. 6 shows a frame structure in a 3GPP based wireless communication system to which implementations of the present disclosure is applied.

FIG. 6 shows a frame structure in a 3GPP based wireless communication system to which implementations of the present disclosure is applied.

The frame structure shown in FIG. 6 is purely exemplary and the number of subframes, the number of slots, and/or the number of symbols in a frame may be variously changed. In the 3GPP based wireless communication system. OFDM numerologies (e.g., subcarrier spacing (SCS), transmission time interval (TTI) duration) may be differently configured between a plurality of cells aggregated for one UE. For example, if a UE is configured with different SCSs for cells aggregated for the cell, an (absolute time) duration of a time resource (e.g., a subframe, a slot, or a TTI) including the same number of symbols may be different among the aggregated cells. Herein, symbols may include OFDM symbols (or CP-OFDM symbols), SC-FDMA symbols (or discrete Fourier transform-spread-OFDM (DFT-s-OFDM) symbols).

Referring to FIG. 6, downlink and uplink transmissions are organized into frames. Each frame has $T_f$=10 ms duration. Each frame is divided into two half-frames, where each of the half-frames has 5 ms duration. Each half-frame consists of 5 subframes, where the duration $T_{sf}$ per subframe is 1 ms. Each subframe is divided into slots and the number of slots in a subframe depends on a subcarrier spacing. Each slot includes 14 or 12 OFDM symbols based on a cyclic prefix (CP). In a normal CP, each slot includes 14 OFDM symbols and, in an extended CP, each slot includes 12 OFDM symbols. The numerology is based on exponentially scalable subcarrier spacing $\beta f = 2^u * 15$ KHz.

Table 3 shows the number of OFDM symbols per slot $N^{slot}_{symb}$, the number of slots per frame $N^{frame,u}_{slot}$, and the number of slots per subframe $N^{subframe,u}_{slot}$ for the normal CP, according to the subcarrier spacing $\beta f = 2^u * 15$ KHz.

TABLE 3

| u | $N^{slot}_{symb}$ | $N^{frame,\,u}_{slot}$ | $N^{subframe,\,u}_{slot}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |

Table 4 shows the number of OFDM symbols per slot $N^{slot}_{symb}$, the number of slots per frame $N^{frame,u}_{slot}$, and the number of slots per subframe $N^{subframe,u}_{slot}$ for the extended CP, according to the subcarrier spacing $\beta f = 2^u * 15$ KHz.

TABLE 4

| u | $N^{slot}_{symb}$ | $N^{frame,\,u}_{slot}$ | $N^{subframe,\,u}_{slot}$ |
|---|---|---|---|
| 2 | 12 | 40 | 4 |

A slot includes plural symbols (e.g., 14 or 12 symbols) in the time domain. For each numerology (e.g., subcarrier spacing) and carrier, a resource grid of $N^{size,u}_{grid,x} * N^{RB}_{sc}$ subcarriers and $N^{subframe,u}_{symb}$ OFDM symbols is defined, starting at common resource block (CRB) $N^{start,u}_{grid}$ indicated by higher-layer signaling (e.g., RRC signaling), where $N^{size,u}_{grid,x}$ is the number of resource blocks (RBs) in the resource grid and the subscript x is DL for downlink and UL for uplink. $N^{RB}_{sc}$ is the number of subcarriers per RB. In the 3GPP based wireless communication system, $N^{RB}_{sc}$ is 12 generally. There is one resource grid for a given antenna port p, subcarrier spacing configuration u, and transmission direction (DL or UL). The carrier bandwidth $N^{size,u}_{grid}$ for subcarrier spacing configuration u is given by the higher-layer parameter (e.g., RRC parameter). Each element in the resource grid for the antenna port p and the subcarrier spacing configuration u is referred to as a resource element (RE) and one complex symbol may be mapped to each RE. Each RE in the resource grid is uniquely identified by an index k in the frequency domain and an index l representing a symbol location relative to a reference point in the time domain. In the 3GPP based wireless communication system, an RB is defined by 12 consecutive subcarriers in the frequency domain. In the 3GPP NR system. RBs are classified into CRBs and physical resource blocks (PRBs).

CRBs are numbered from 0 and upwards in the frequency domain for subcarrier spacing configuration u. The center of subcarrier 0 of CRB 0 for subcarrier spacing configuration u coincides with 'point A' which serves as a common reference point for resource block grids. In the 3GPP NR system. PRBs are defined within a bandwidth part (BWP) and numbered from 0 to $N^{size}_{BWP,i}-1$, where i is the number of the bandwidth part. The relation between the physical resource block $n_{PRB}$ in the bandwidth part i and the common resource block $n_{CRB}$ is as follows: $n_{PRB} = n_{CRB} + N^{size}_{BWP,i}$, where $N^{size}_{BWP,i}$ is the common resource block where bandwidth part starts relative to CRB 0. The BWP includes a plurality of consecutive RBs. A carrier may include a maximum of N (e.g., 5) BWPs. A UE may be configured with one or more BWPs on a given component carrier. Only one BWP among BWPs configured to the UE can active at a time. The active BWP defines the UE's operating bandwidth within the cell's operating bandwidth.

In the present disclosure, the term "cell" may refer to a geographic area to which one or more nodes provide a communication system, or refer to radio resources. A "cell" as a geographic area may be understood as coverage within which a node can provide service using a carrier and a "cell" as radio resources (e.g., time-frequency resources) is associated with bandwidth which is a frequency range configured by the carrier. The "cell" associated with the radio resources is defined by a combination of downlink resources and uplink resources, for example, a combination of a DL component carrier (CC) and a UL CC. The cell may be configured by downlink resources only, or may be configured by downlink resources and uplink resources. Since DL coverage, which is a range within which the node is capable of transmitting a valid signal, and UL coverage, which is a range within which the node is capable of receiving the valid signal from the UE, depends upon a carrier carrying the signal, the coverage of the node may be associated with coverage of the "cell" of radio resources used by the node. Accordingly, the term "cell" may be used to represent service coverage of the node sometimes, radio resources at other times, or a range that signals using the radio resources can reach with valid strength at other times.

In CA, two or more CCs are aggregated. A UE may simultaneously receive or transmit on one or multiple CCs depending on its capabilities. CA is supported for both contiguous and non-contiguous CCs. When CA is configured, the UE only has one RRC connection with the network. At RRC connection establishment/re-establishment/handover, one serving cell provides the NAS mobility information, and at RRC connection re-establishment/handover, one serving cell provides the security input. This cell is referred to as the primary cell (PCell). The PCell is a cell, operating on the primary frequency, in which the UE either performs the initial connection establishment procedure or initiates the connection re-establishment procedure. Depending on UE capabilities, secondary cells (SCells) can be configured to form together with the PCell a set of serving cells. An SCell is a cell providing additional radio resources on top of special cell (SpCell). The configured set of serving cells for a UE therefore always consists of one PCell and one or more SCells. For dual connectivity (DC) operation, the term SpCell refers to the PCell of the master cell group (MCG) or the primary SCell (PSCell) of the secondary cell group (SCG). An SpCell supports PUCCH transmission and contention-based random access, and is always activated. The MCG is a group of serving cells associated with a master node, comprised of the SpCell (PCell) and optionally one or more SCells. The SCG is the subset of serving cells associated with a secondary node, comprised of the PSCell and zero or more SCells, for a UE configured with DC. For a UE in RRC_CONNECTED not configured with CA/DC, there is only one serving cell comprised of the PCell. For a UE in RRC_CONNECTED configured with CA/DC, the term "serving cells" is used to denote the set of cells comprised of the SpCell(s) and all SCells. In DC, two MAC entities are configured in a UE: one for the MCG and one for the SCG.

Figure 7:
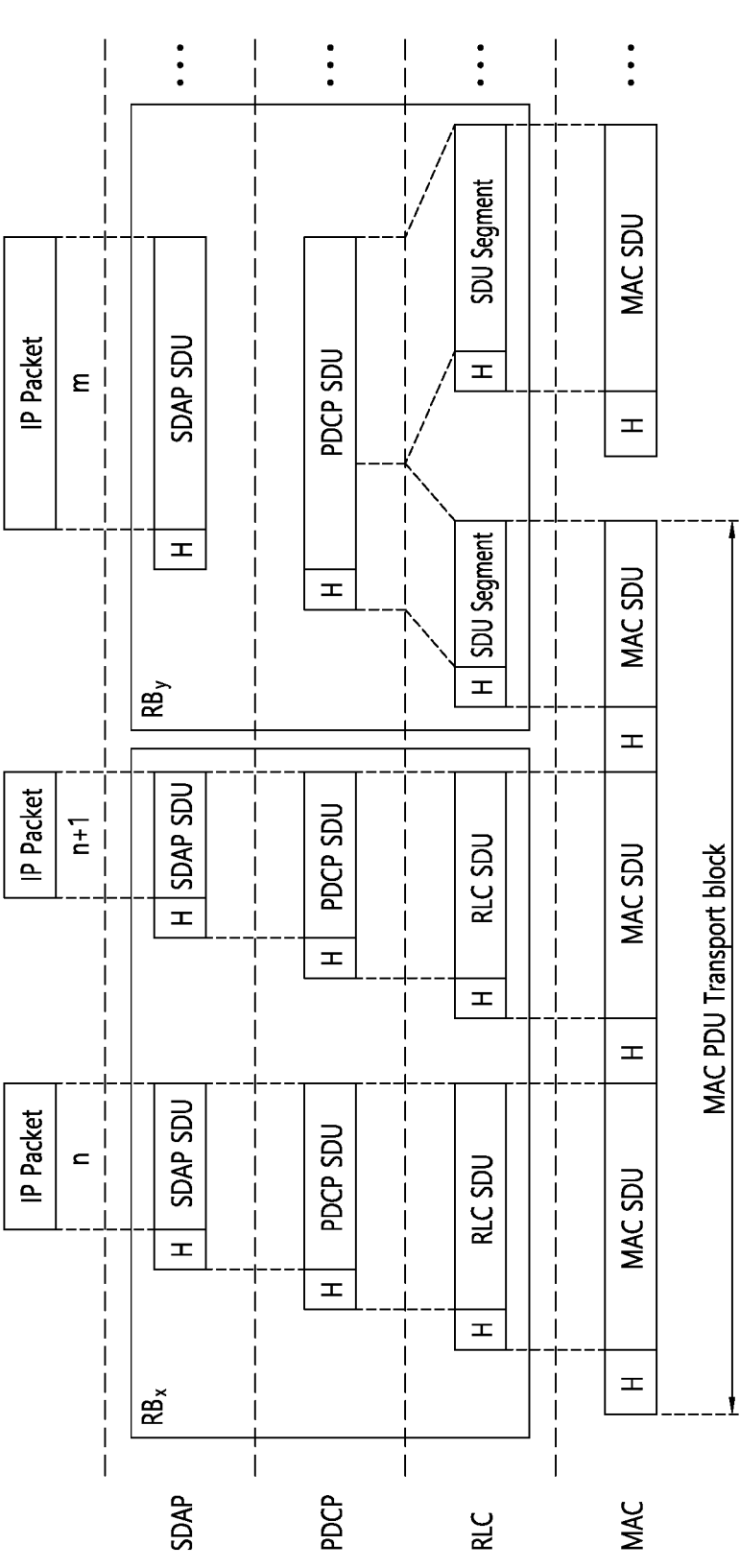
FIG. 7 shows a data flow example in the 3GPP NR system to which implementations of the present disclosure is applied.

FIG. 7 shows a data flow example in the 3GPP NR system to which implementations of the present disclosure is applied.

Referring to FIG. 7. "RB" denotes a radio bearer, and "H" denotes a header. Radio bearers are categorized into two groups: DRBs for user plane data and SRBs for control plane data. The MAC PDU is transmitted/received using radio resources through the PHY layer to/from an external device. The MAC PDU arrives to the PHY layer in the form of a transport block.

In the PHY layer, the uplink transport channels UL-SCH and RACH are mapped to their physical channels physical uplink shared channel (PUSCH) and physical random access channel (PRACH), respectively, and the downlink transport channels DL-SCH, BCH and PCH are mapped to physical downlink shared channel (PDSCH), physical broadcast channel (PBCH) and PDSCH, respectively. In the PHY layer, uplink control information (UCI) is mapped to physical uplink control channel (PUCCH), and downlink control information (DCI) is mapped to physical downlink control channel (PDCCH). A MAC PDU related to UL-SCH is transmitted by a UE via a PUSCH based on an UL grant, and a MAC PDU related to DL-SCH is transmitted by a BS via a PDSCH based on a DL assignment.

Hereinafter, quasi co-location (QCL) and transmission configuration indication/indicator (TCI) state are described.

An antenna port is defined such that the channel over which a symbol on an antenna port is carried can be inferred from the channel over which other symbols on the same antenna port are carried. If the properties of a channel over which a symbol on one antenna port is carried can be inferred from a channel over which a symbol on another antenna port is carried, the two antenna ports can be said to have a quasi co-located/quasi co-location (QCL) relationship.

Here, the channel characteristics include one or more of delay spread, average delay, Doppler spread, frequency/Doppler shift, average received power, received timing/average delay average delay), Spatial RX parameter. Here, the Spatial Rx parameter means a spatial (receiving) channel characteristic parameter such as an angle of arrival.

For example, when an antenna port associated with a reference signal and an antenna port on which a symbol is conveyed over a channel are QCL'ed (i.e., the reference signal and the channel are QCL'ed or the channel is QCL'ed with the reference signal), the reference signal and the channel are assumed to be transmitted/received using the same beam. In this case, QCL information for the channel may be the reference signal and/or a beam corresponding to the reference signal, and TCI state of the channel may indicate the QCL information for the channel. In conclusion, beam/TCI (or TCI state)/QCL (or QCL information) may have the same meaning and may be used interchangeably.

The UE may receive via RRC a configuration for a list of up to M candidate Transmission Configuration Indication (TCI) states, at least for the purpose of quasi co-location (QCL) indication. Here, M may vary depending on the capability of the UE, and may be, for example, 64.

Each TCI state can be configured as one RS set. Each ID of DL RS for spatial QCL purpose (QCL Type D) in at least RS set may refer to one of DL RS types such as SSB, P-CSI RS, SP-CSI RS, and A-CSI RS.

At least initialization/update of the ID of the DL RS(s) in the RS set used for spatial QCL purposes may be performed through at least explicit signaling.

Table 5 below shows an example of TCI-State IE.

The TCI-State IE associates one or two DL reference signals (RS) with corresponding quasi co-location (QCL) types.

TABLE 5

-- ASN1START-- TAG-TCI-STATE-STARTTCI-State ::= SEQUENCE {tci-StateIdTCI-StateId,qcl-Type1QCL-Info,qcl-Type2QCL-InfoOPTIONAL,-- Need R...}QCL-Info ::=SEQUENCE {cellServCellIndexOPTIONAL,-- Need Rbwp-IdBWP-IdOPTIONAL, -- Cond CSI-RS-IndicatedreferenceSignalCHOICE {csi-rsNZP-CSI-RS-ResourceId,ssbSSB-Index},qcl-TypeENUMERATED {typeA, typeB, typeC, typeD},...}-- TAG-TCI-STATE-STOP-- ASN1STOP

30

In Table 5, the bwp-Id parameter represents the DL BWP where the RS is located, and the cell parameter represents the serving cell of the UE for which the referenceSignal parameter is configured. Only when the qcl-Type parameter is set to typeC or typeD, the RS can be located in a serving cell other than the serving cell in which the TCI-state is configured. The referencesignal parameter indicates a reference signal for which QCL information is provided, and may specifically indicate a reference antenna port(s) serving as a source of quasi co-location for a corresponding target antenna port(s) or a reference signal associated with the reference antenna port(s). The target antenna port(s) may associated with CSI-RS, PDCCH DMRS, or PDSCH DMRS. For example, in order to indicate QCL reference RS information for NZP CSI-RS, a corresponding TCI state ID may be indicated in NZP CSI-RS resource configuration information. As another example, in order to indicate QCL reference information for PDCCH DMRS antenna port(s), TCI state ID may be indicated in each CORESET configuration. As another example, TCI state ID may be indicated through DCI to indicate QCL reference information for PDSCH DMRS antenna port(s). In order for a UE to decode a PDSCH according to a detected PDCCH having an intended DCI for a corresponding UE and a given serving cell, a list of up to M TCI-State configurations in higher layer parameter PDSCH-Config can be configured. The M depends on UE capability.

Each TCI-State may include parameters for configuring a QCL relationship between one (or two) DL reference signals and DM-RS port(s) of PDSCH (or quasi co-location relationship between DM-RS port(s) of PDCCH or CSI-RS port(s) of CSI-RS resource).

Quasi co-location relationship is configured by the higher layer parameter qcl-Type 1 for the first DL RS and qcl-Type 2 (if configured) for the second DL RS. In the case of two DL RSs, regardless of whether the reference is the same DL RS or different DL RSs, the QCL type may not be the same.

The quasi co-location type corresponding to each DL RS is given by the higher layer parameter qcl-Type of QCL-Info, and can take one of the following values:

- 'QCL-TypeA': {Doppler shift, Doppler spread, average delay, delay spread}
- 'QCL-TypeB': {Doppler shift, Doppler spread}
- 'QCL-TypeC': {Doppler shift, average delay}
- 'QCL-TypeD': {Spatial Rx parameter}

For example, if the target antenna port corresponds to a specific NZP CSI-RS, the corresponding NZP CSI-RS antenna ports may be indicated/configured to be QCL with a specific TRS in terms of QCL-Type A and a specific SSB in terms of QCL-Type D. The UE receiving this instruction/configuration receives the corresponding NZP CSI-RS using the Doppler and delay values measured in the QCL-TypeA TRS, and may apply the reception beam used for QCL-TypeD SSB reception to corresponding NZP CSI-RS reception.

The UE receives an activation command by MAC CE signaling used to map up to 8 TCI states to the codepoint of the DCI field 'Transmission Configuration Indication' of one CC/DL BWP or each set of CCs/DL BWPs.

Hereinafter, contents regarding transmit/receive point (TRP) is described.

Figure 8:
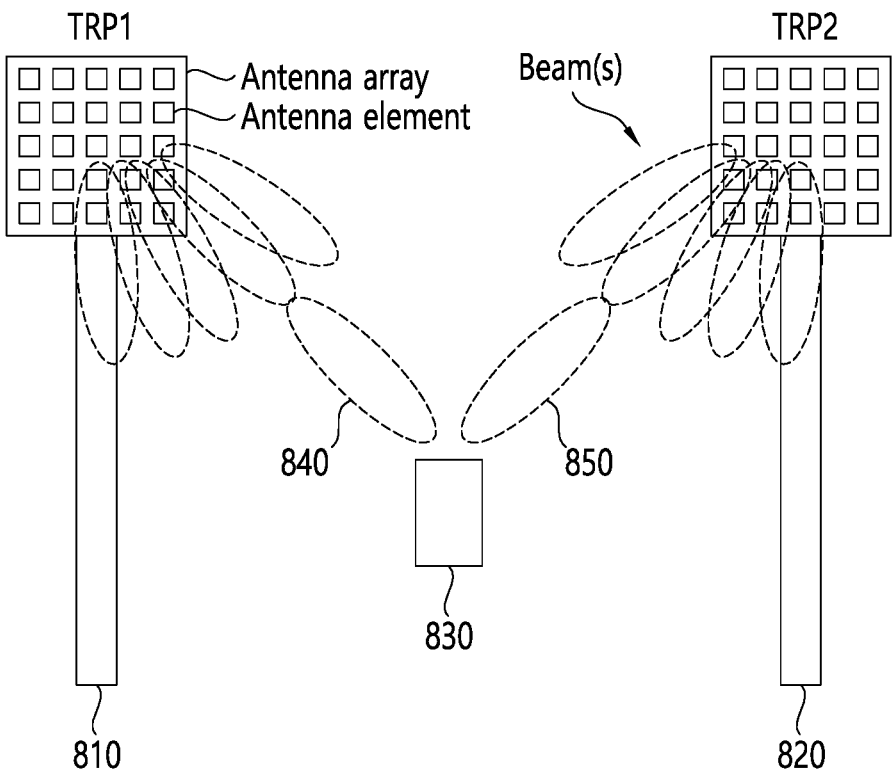
FIG. 8 shows an example of an MTRP based communication according to an embodiment of the present disclosure.

FIG. 8 shows an example of an MTRP based communication according to an embodiment of the present disclosure.

Referring to FIG. 8, UE 830 is connected to a network via MTRP including TRP1 810 and TRP2 820. Each TRP may form a plurality of beams, and communicate with the UE 830 via one or more of the plurality of beams. For example, TRP1 810 may communicate with the UE 830 via a beam 840 among a plurality of beams formed by the TRP1 810, and TRP2 820 may communicate with the UE 830 via a beam 850 among a plurality of beams formed by the TRP2 820.

A beam may formed by a radiation from a plurality of antenna elements in an antenna array of a TRP. The antenna array and/or at least one antenna element may be related to one or more antenna ports. An antenna port may be defined such that the channel over which a symbol on the antenna port is conveyed can be inferred from the channel over which another symbol on the same antenna port is conveyed. That is, the antenna port is a logical concept, and the channel that is transmitted by a specific antenna port can be done by using a reference signal assigned for the specific antenna port. This means that each antenna port has its own reference signal.

The beam may be represented as a quasi co-location (QCL) information and/or a transmission configuration indication (TCI) state.

In an example, TRPs may be related to the same physical cell identifier (ID), but located in different geographical locations.

In an example, TRPs may be distinguished based on a control resource set (CORESET). That is, different TRPs may be associated with different CORESETs/CORESET IDS.

In an example, TRPs may be distinguished based on a TCI state. That is, different TRPs may be associated with different TCI states.

In an example, TRPs may be distinguished based on QCL information. That is, different TRPs may be associated with different QCL information.

In an example, TRPs may be distinguished based on a beam. That is, different TRPs may be associated with different beams.

M-TRP (Multiple TRP) Transmission

In Multiple Transmit/Receive Point (multi-TRP) operation, a serving cell can schedule the UE from two TRPs, providing better coverage, reliability and/or data rates for PDSCH, PDCCH, PUSCH, and PUCCH.

There are two different operation modes to schedule multi-TRP PDSCH transmissions: single-DCI and multi-DCI. For both modes, control of uplink and downlink operation can be done by physical layer and MAC layer, within the configuration provided by the RRC layer. In single-DCI mode, the UE is scheduled by the same DCI for both TRPs and in multi-DCI mode, the UE is scheduled by independent DCIs from each TRP.

There are two different operation modes for multi-TRP PDCCH: PDCCH repetition and SFN based PDCCH transmission. In both modes, the UE can receive two PDCCH transmissions, one from each TRP, carrying the same DCI. In PDCCH repetition mode, the UE can receive the two PDCCH transmissions carrying the same DCI from two linked search spaces each associated with a different CORESET. In SFN based PDCCH transmission mode, the UE can receive the two PDCCH transmissions carrying the same DCI from a single search space/CORESET using different TCI states.

For multi-TRP PUSCH repetition, according to indications in a single DCI or in a semi-static configured grant provided over RRC, the UE performs PUSCH transmission of the same contents toward two TRPs with corresponding beam directions associated with different spatial relations. For multi-TRP PUCCH repetition, the UE performs PUCCH transmission of the same contents toward two TRPs with corresponding beam directions associated with different spatial relations.

For inter-cell multi-TRP operation, for multi-DCI PDSCH transmission, one or more TCI states can be associated with SSB with a PCI different from the serving cell PCI. The activated TCI states can be associated with at most one PCI different from the serving cell PCI at a time.

The M-TRP transmission method in which M TRPs transmit data to one user equipment (UE) may comprise eMBB M-TRP transmission as a method to increase transmission rate, and/or transmission of URLLC M-TRP as a method for increasing reception success rate and reducing latency.

In addition, from the viewpoint of downlink control information (DCI) transmission, M-TRP (multiple TRP) transmission schemes may comprise i) M-DCI (multiple DCI) based M-TRP transmission in which each TRP transmits a different DCI, and/or ii) S-DCI (single DCI) based M-TRP transmission method in which one TRP transmits DCI. For example, in the case of S-DCI, since all scheduling information for data transmitted by M TRPs must be delivered through one DCI, it can be used in an ideal BH (ideal backhaul) environment in which dynamic cooperation between two TRPs is possible.

Schemes for multi-TRP based URLLC, scheduled by single DCI at least, may comprise:

Scheme 1 (spatial division multiplexing, SDM): n ($n<=N_s$) TCI states within the single slot, with overlapped time and frequency resource allocation.

1) Scheme 1a:

Each transmission occasion is a layer or a set of layers of the same TB, with each layer or layer set is associated with one TCI and one set of DMRS port(s).

Single codeword with one RV is used across all spatial layers or layer sets. From the UE perspective, different coded bits are mapped to different layers or layer sets with the same mapping rule.

2) Scheme 1b:

Each transmission occasion is a layer or a set of layers of the same TB, with each layer or layer set is associated with one TCI and one set of DMRS port(s).

Single codeword with one RV is used for each spatial layer or layer set. The RVs corresponding to each spatial layer or layer set can be the same or different.

3) Scheme 1c:

One transmission occasion is one layer of the same TB with one DMRS port associated with multiple TCI state indices, or one layer of the same TB with multiple DMRS ports associated with multiple TCI state indices one by one.

For Scheme 1a and 1c, the same MCS is applied for all layers or layer sets.

For scheme 1b, same or different MCS/modulation orders for different layers or layer sets can be discussed.

Scheme 2 (frequency division multiplexing, FDM): n ($n<=N_f$) TCI states within the single slot, with non-overlapped frequency resource allocation Each non-overlapped frequency resource allocation is associated with one TCI state.

Same single/multiple DMRS port(s) are associated with all non-overlapped frequency resource allocations.

1) Scheme 2a:

Single codeword with one RV is used across full resource allocation. From UE perspective, the common RB mapping (codeword to layer mapping) is applied across full resource allocation.

2) Scheme 2b:

Single codeword with one RV is used for each non-overlapped frequency resource allocation. The RVs corresponding to each non-overlapped frequency resource allocation can be the same or different.

For scheme 2a, same MCS is applied for all non-overlapped frequency resource allocations For scheme 2b, same or different MCS/modulation orders for different non-overlapped frequency resource allocations can be discussed.

Scheme 3 (time division multiplexing, TDM): n ($n<=Nu$) TCI states within the single slot, with non-overlapped time resource allocation Each transmission occasion of the TB has one TCI and one RV with the time granularity of mini-slot.

All transmission occasion(s) within the slot use a common MCS with same single or multiple DMRS port(s).

RV/TCI state can be same or different among transmission occasions.

Scheme 4 (TDM): n ($n<=N_{t2}$) TCI states with K ($n<=K$) different slots.

Each transmission occasion of the TB has one TCI and one RV.

All transmission occasion(s) across K slots use a common MCS with same single or multiple DMRS port(s).

RV/TCI state can be same or different among transmission occasions.

In TDM based URLLC, scheme 4 means a method in which one TRP transmits TB in one slot, and has an effect of increasing the probability of data reception through the same TB received from multiple TRPs in multiple slots. In contrast, Scheme 3 means a method in which one TRP transmits TB through several consecutive OFDM symbols (i.e., symbol groups), and several TRPs can be configured to transmit the same TB through different symbol groups within one slot.

In addition, the UE recognizes the PUSCH (or PUCCH) scheduled by the DCI received with different CORESETs (or CORESETs belonging to different CORESET groups) as PUSCHs (or PUCCHs) transmitted to different TRPs or PUSCHs (or PUCCH) of different TRPs. In addition, the method for UL transmission (e.g., PUSCH/PUCCH) transmitted through different TRPs can be equally applied to UL transmission (e.g., PUSCH/PUCCH) transmitted through different panels belonging to the same TRP.

Multiple DCI Based NCJT/Single DCI Based NCJT Description

Non-coherent joint transmission (NCJT) is a method in which multiple transmission points (TPs) transmit data to one user equipment (UE) using the same time frequency, and the multiple TPs transmit data to different layers using different DMRS (Demodulation Multiplexing Reference Signal) ports. The TP transmits DCI comprising data scheduling information to the UE receiving the NCJT, and in this case, a method in which each TP participating in NCJT transfers scheduling information for data transmitted by itself via DCI is referred to as multi DCI based NCJT. Since the N TPs participating in NCJT transmission each transmit DL grant DCI and PDSCH to the UE, the UE receives N DCIs and N PDSCHs from the N TPs. Unlike this, a method in which one representative TP transfers scheduling information for data transmitted by itself and data transmitted by another TP through one DCI is referred to as single DCI based NCJT. In this case. N TPs transmit one PDSCH, but each TP transmits only some of the multiple layers constituting one PDSCH. For example, when 4-layer data is transmitted. TP 1 transmits 2 layers and TP 2 transmits the remaining 2 layers to the UE.

Multiple TRP (MTRP) with NCJT transmission can transmit DL data to the UE in one of the following two ways.

First, the single DCI based MTRP method is introduced. MTRP cooperatively transmits a common PDSCH together, and each TRP participating in cooperative transmission transmits the corresponding PDSCH by spatially dividing it into different layers (i.e., different DMRS ports). In this case, the scheduling information for the PDSCH is indicated to the UE through one DCI, and the corresponding DCI indicates which DMRS port uses which QCL RS and QCL type information (This is different from indicating the QCL RS and TYPE that will be commonly applied to all DMRS ports previously indicated in DCI). That is. M TCI states are indicated through the TCI field in the DCI (M=2 in the case of 2 TRP cooperative transmission), and the QCL RS and type are identified using different M TCI states for each M DMRS port group. Also, DMRS port information may be indicated using a new DMRS table.

Second, DCI based MTRP method is introduced. MTRP transmits different DCIs and PDSCHs, respectively, and the PDSCHs are transmitted while (partially or entirely) overlapping each other on frequency time resources. The PDSCHs are scrambled through different scrambling IDs, and corresponding DCIs can be transmitted through CORESETs belonging to different CORESET groups.

A CORESET group can be identified as an index defined within the CORESET configuration of each CORESET. For example, if CORESET 1 and 2 are configured with index=0 and CORESET 3 and 4 are configured with index=1, CORESET 1 and 2 belong to CORESET group 0, and CORESET 3 and 4 belong to CORESET group 1. Also, if the index of CORESET is not defined, it can be interpreted as index=0).

In one serving cell, if multiple scrambling IDs are configured or two or more CORESET groups are configured, the UE receives data through multiple DCI based MTRP operation.

For example, whether a single DCI based MTRP scheme or a multiple DCI based MTRP scheme may be indicated to the UE through separate signaling. For example, when multiple CRS patterns are indicated to the UE for MTRP operation for one serving cell, PDSCH rate matching for the CRS may vary depending on whether it is a single DCI based MTRP method or multiple DCI based MTRP method.

Partially Overlapped NCJT

In addition, NCJT is divided into two types: fully overlapped NCJT in which time and frequency resources transmitted by each TP completely overlap, and partially overlapped NCJT in which only some time and frequency resources are overlapped. That is, in the case of partially overlapped NCJT, both transmission data of TP 1 and TP2 are transmitted in some time-frequency resources, and only one TP among TP 1 or TP 2 transmits data in the remaining time-frequency resources.

Reliability Improvement Method in Multi-TRP

The following two methods can be considered as transmission/reception methods for improving reliability using transmission in multiple TRPs.

Figure 9A:
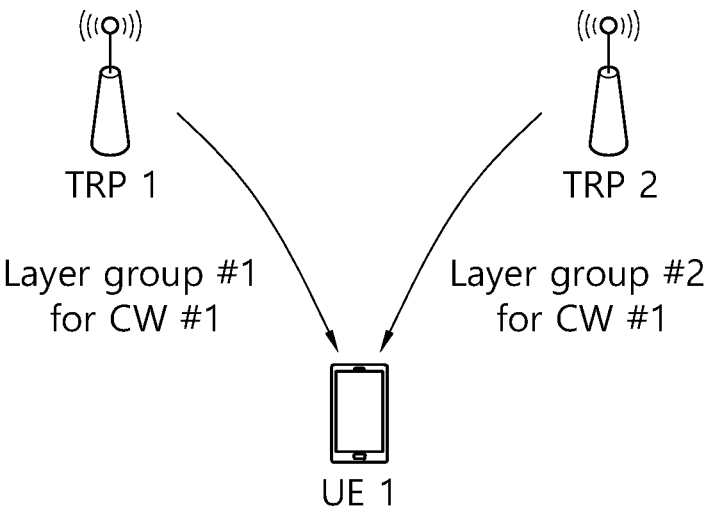
FIG. 9A shows an example of transmitting the same codeword/TB through layer groups corresponding to different TRPs according to an embodiment of the present disclosure.

FIG. 9A shows an example of transmitting the same codeword/TB through layer groups corresponding to different TRPs according to an embodiment of the present disclosure.

Referring to FIG. 9A, a layer group may mean a certain layer set comprising one or more layers. In this case, the number of layers increases the amount of transmission resources, and through this, there is an advantage that robust channel coding with a low code rate can be used for TB, and also, since the channels from multiple TRPs are different, reliability improvement of the received signal can be expected based on the diversity gain.

Figure 9B:
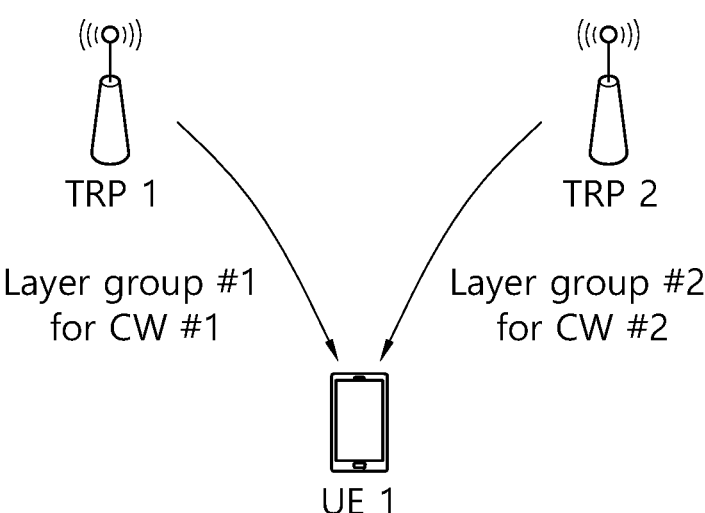
FIG. 9B shows an example of transmitting different codewords through layer groups corresponding to different TRPs according to an embodiment of the present disclosure.

FIG. 9B shows an example of transmitting different codewords through layer groups corresponding to different TRPs according to an embodiment of the present disclosure.

Referring to FIG. 9B, it can be assumed that TBs corresponding to the codeword #1 (CW #1) and CW #2 are the same. Therefore, the example in FIG. 9B may be construed as repetitively transmitting the same TB. The example in FIG. 9B may have a demerit that code rate corresponding to TB may be high compared to the example in FIG. 9A. However, the example in FIG. 9B may have a merit compared to the example in FIG. 9A that depending on the channel environment, the code rate can be adjusted by indicating different RV (redundancy version) values for the encoding bits generated from the same TB, or the modulation order of each CW can be adjusted.

In FIGS. 9A and 9B, as the same TB is repeatedly transmitted through different layer groups and different TRPs/panels transmit each layer group, the data reception probability can be increased. This is called SDM based M-TRP URLLC transmission method. Layers belonging to different layer groups are transmitted through DMRS ports belonging to different DMRS CDM groups.

In addition, although the above-mentioned contents related to multiple TRPs have been described based on a spatial division multiplexing (SDM) method using different layers, but these can also be extended and applied to frequency division multiplexing (FDM) scheme based on different frequency domain resources (e.g., RB/PRB (set)) and/or time division multiplexing (TDM) method based on different time domain resources (e.g., slot, symbol, sub-symbol).

In the mTRP environment, the phases or roles of a plurality of TRPs associated with one cell may not be the same.

For example, the plurality of TRPs may be classified to primary-TRP (p-TRP) that receives/monitors essential system information and sends and receives key control information and secondary TRP (s-TRP) that increases the diversity effect through data boosting or redundant transmission of the same data as that of p-TRP.

For example, in UL transmission power allocation, p-TRP may allocate available power first, and s-TRP may allocate only remaining transmission power.

For example p-TRP may be a TRP using a signal/channel related to a physical cell ID obtained from PSS/SSS, and s-TRP may be a TRP using a signal/channel related to another PCI. In general, p-TRP is basically configured in one serving cell, and s-TRP associated with this serving cell may be optionally configured. When a s-TRP uses a serving cell resource, the s-TRP can be called intra-cell s-TRP. When a s-TRP uses a non-serving cell resource, the s-TRP can be called inter-cell s-TRP.

For example, a TRP that performs more accurate beam management by mainly performing BFD/RLM is defined as p-TRP, and a TRP configured to perform more relaxed BFD/RLM compared to BFD/RLM performed in p-TRP or not to perform BFD/RLM operation may be defined as s-TRP.

For example, in operating a serving cell related to multiple TRPs, the TRP used as the criterion for DL/UL synch of multiple TRPs is defined as p-TRP, and a TRP that matches DL/UL sync by applying an offset based on the synch timing of p-TRP can be defined as s-TRP.

In this way, if there is a difference between an operation performed in the p-TRP and an operation performed in the s-TRP, a difference between the p-TRP and the s-TRP may occur in data transmission/reception performance or reliability of a link. When the type of data to be transmitted by the UE is diverse and different types of data occur at different times, it may be optimal for the UE to select a TRP to be used for transmission of the data according to the type/characteristic of the data. For example, in the case of data requiring relatively high reliability/low latency, the UE may use p-TRP to increase the probability of satisfying the QoS requirements of the data, and for data requiring relatively low reliability/low latency, the UE may use s-TRP. Therefore, the UE can obtain an optimal trade-off in efficiency of multi-use TRP resources and satisfaction in transmission performance.

Meanwhile, to achieve the optimal trade-off between radio efficiency and QoS satisfaction, the present disclosure proposes methods for mapping between logical channels and TRPs such that a certain logical channel can be transmitted only on restricted TRPs. Such mapping between LCHs and TRPs affects logical channel prioritization.

Hereinafter, the mTRP operation may be an operation for the same component carrier (CC)/bandwidth part (BWP), and the same or different set of TRP(s) may perform transmission and reception for a plurality of CCs/BWPs.

For convenience of description below, a single S-TRP is mainly assumed, but the technology of the present disclosure can be extended and applied to a plurality of S-TRPs. S-TRP can operate in the same or different cell as P-TRP.

FIG. 10 shows an example of a method performed by a UE according to an embodiment of the present disclosure. The method may also be performed by a wireless device.

Referring to FIG. 10, in step S1001, the UE may identify mapping information for one or more TRPs associated with each of logical channels.

According to various embodiments, the one or more TRPs may be associated with one or more serving cells allowed for each of the logical channels.

According to various embodiments, the one or more serving cells may comprise all serving cells allowed for each of the logical channels.

According to various embodiments, the mapping information may comprise information for corresponding one or According to various embodiments, the UE may identify the mapping information that is preconfigured or stored in the UE.

According to various embodiments, the UE may receive, from a network, a message comprising a configuration for each of the logical channels. The configuration may comprise the mapping information.

According to various embodiments, the message may be at least one of a radio resource control (RRC) setup message, RRC resume message or RRC reconfiguration message.

The UE may obtain/receive configuration for TRP restriction based on restrictive logical channel prioritization and/or configuration for restrictive logical channel prioritization based on TRP restriction, in step S1001.

For at least one logical channel, a TRP restriction may be configured to the UE, where TRP restriction may indicate the allowed TRP(s) that can be used for transmission of the logical channel. For instance, if TRPs are denoted as TRP indexes such as TRP1 and TRP2, the TRP restriction can be configured via RRC signaling as at least one of the following methods 1 to 3.

Method 1) In this example, TRP restriction can be configured via a new field allowedTRP that is configured within a configuration of a certain logical channel (i.e., Logical-ChannelConfig), as shown in table 6 below:

TABLE 6

```
- LogicalChannelConfigThe IE LogicalChannelConfig is used to configure the logical
channel parameters.LogicalChannelConfig information element-- ASN1START-- TAG-
LOGICALCHANNELCONFIG-STARTLogical ChannelConfig                    ::=
SEQUENCE                      {                        ul-SpecificParameters
SEQUENCE                    {                        priority
INTEGER                  (1..16),                    prioritisedBitRate
ENUMERATED {kBps0, kBps8, kBps16, kBps32, kBps64, kBps128, KBps256, KBps512,
kBps1024, kBps2048, kBps4096, kBps8192, kBps16384, kBps32768, kBps65536, infinity},
bucketSizeDuration                              ENUMERATED {ms5, ms10,
ms20,        ms50,        ms100,        ms150,        ms300,        ms500,        ms1000,
spare7, spare6, spare5, spare4, spare3, spare2, spare1},           allowedServingCells
SEQUENCE        (SIZE        (1..maxNrofServingCells-1))        OF        ServCellIndex
OPTIONAL,        -- Cond        PDCP-CADuplication                allowedSCS-List
SEQUENCE        (SIZE        (1..maxSCSs))        OF        SubcarrierSpacing
OPTIONAL,        --        Need    R                        maxPUSCH-Duration
ENUMERATED {ms0p02, ms0p04, ms0p0625, ms0p125, ms0p25, ms0p5, spare2, spare1}
OPTIONAL,        --        Need    R                        configured GrantType1 Allowed
ENUMERATED                                                {true}
OPTIONAL,        --        Need    R                        logical Channel Group
INTEGER                                                (0..maxLCG-ID)
OPTIONAL,        --        Need    R                        schedulingRequestID
SchedulingRequestId
OPTIONAL,        --        Need    R                        logicalChannelSR-Mask
BOOLEAN,                                        logical ChannelSR-Delay TimerApplied
BOOLEAN,                ...,                        bitRateQueryProhibitTimer
ENUMERATED        {s0,        s0dot4,        s0dot8,        s1dot6,        s3,        s6,        s12,        s30}
OPTIONAL,        -- Need R                        [[                allowedCG-List-r16
SEQUENCE        (SIZE        (0..        maxNrofConfiguredGrantConfigMAC-1-r16))        OF
ConfiguredGrantConfigIndexMAC-r16
OPTIONAL,        --        Need    S                        allowedPHY-Priority Index-r16
ENUMERATED                                                {p0,                        p1}
OPTIONAL                        --                Need        S                        ]]
[[                                                                        allowedTRP
CHOICE        {TRP1,        TRP2,        both}                        ]]                }
OPTIONAL,        -- Cond UL                ...,        [[                channel AccessPriority-r16
INTEGER                                                (1..4)
OPTIONAL,        --                Need        R                bitRateMultiplier-r16
ENUMERATED                {x40,                x70,                x100,                x200}
OPTIONAL        -- Need R                ]]}--        TAG-LOGICALCHANNELCONFIG-STOP--
ASN1STOP
``` more TRPs associated with each of the one or more serving cells.

According to various embodiments, each of the logical channels may be associated with a corresponding logical channel priority. The mapping information may comprise information for corresponding one or more TRPs associated with each logical channel priority.

In this example, the mapping information may comprise the field allowedTRP. The field allowedTRP can be set to one of three codepoints {TRP1, TRP2, and both}. If TRP1 is configured for the logical channel, the logical channel can be transmitted only via TRP1. If TRP2 is configured, the logical channel can be transmitted only via TRP2. If both is configured, the logical channel can be transmitted via TRP1 and TRP2. In this example, allowedTRP is applied to all serving cell(s) allowed for the concerned logical channel. That is, if serving cell restriction for the logical channel is configured via allowedServingCells field, the allowedTRP is applicable to the serving cells listed in allowedServingCells, and allowedTRP is not applicable to other serving cells not listed in allowedServingCells. If the serving cell restriction for the logical channel is not configured, then allowedTRP is applicable to any serving cell that can be used for transmission of the logical channel transmission (e.g., any serving cell of a cell group for which the concerned logical is configured).

Method 2) In this example, different TRP restriction can be configured via a list of allowedTRP for different serving cells allowed for the transmission of the logical channel, as shown in table 7:

TABLE 7

- LogicalChannelConfigThe IE LogicalChannelConfig is used to configure the logical channel parameters.LogicalChannelConfig information element-- ASN1START-- TAG-LOGICALCHANNELCONFIG-STARTLogicalChannelConfig ::=
SEQUENCE { ul-SpecificParameters
SEQUENCE { priority
INTEGER (1..16), prioritisedBitRate
ENUMERATED {kBps0, kBps8, kBps16, KBps32, kBps64, kBps128, KBps256, KBps512, kBps1024, kBps2048, kBps4096, kBps8192, kBps16384, kBps32768, kBps65536, infinity}, bucketSizeDuration ENUMERATED {ms5, ms10, ms20, ms50, ms100, ms150, ms300, ms500, ms1000, spare7, spare6, spare5, spare4, spare3, spare2, spare1}, allowedServingCells
SEQUENCE (SIZE (1..maxNrofServingCells-1)) OF ServCellIndex
OPTIONAL, -- Cond PDCP-CADuplication allowedSCS-List
SEQUENCE (SIZE (1..maxSCSs)) OF SubcarrierSpacing
OPTIONAL, -- Need R maxPUSCH-Duration
ENUMERATED {ms0p02, ms0p04, ms0p0625, ms0p125, ms0p25, ms0p5, spare2, spare1}
OPTIONAL, -- Need R configuredGrantType1 Allowed
ENUMERATED {true}
OPTIONAL, -- Need R logical Channel Group
INTEGER (0..maxLCG-ID)
OPTIONAL, -- Need R schedulingRequestID
SchedulingRequestId
OPTIONAL, -- Need R logicalChannelSR-Mask
BOOLEAN, logicalChannelSR-DelayTimerApplied
BOOLEAN, ..., bitRateQueryProhibitTimer
ENUMERATED {s0, s0dot4, s0dot8, s1dot6, s3, s6, s12, s30}
OPTIONAL, -- Need R [[ allowedCG-List-r16
SEQUENCE (SIZE (0.. maxNrofConfiguredGrantConfigMAC-1-r16)) OF ConfiguredGrantConfigIndexMAC-r16
OPTIONAL, -- Need S allowedPHY-Priority Index-r16
ENUMERATED {p0, p1}
OPTIONAL -- Need S ]]
[[ allowedTRPList
SEQUENCE (SIZE (1..maxNrofServingCells-1)) of
AllowedTRP ]] }
OPTIONAL, -- Cond UL ..., [[ channelAccessPriority-r16
INTEGER (1..4)
OPTIONAL, -- Need R bitRateMultiplier-r16
ENUMERATED {x40, x70, x100, x200}
OPTIONAL -- Need R ]]} AllowedTRP ::=CHOICE {TRP1, TRP2, both}--
TAG-LOGICALCHANNELCONFIG-STOP-- ASN1STOP In this example, the mapping information may comprise the list of allowedTRP (i.e., allowedTRPList). The number of entries within allowedTRPList is the same as allllowedServingCells. For example, if allowedServingCells has two entries comprising serving cell 1 and serving cell 2, allowedTRPList also has two entries of allowedTRP, where the first allowedTRP entry corresponds to the first serving cell (serving cell1) and the second allowedTRP entry corresponds to the second serving cell (serving cell2). In methods 1 and/or 2, The codepoint TRP1 may correspond to p-TRP, and TRP2 may corresponds to s-TRP. In case more than one s-TRP are configured, allowedTRP may have more than three possible codepoints. For example, in case N s-TRPs are configured, allowedTRP can be set to one of {TRP1, TRP2, 쪋, TRP_N}, where the codepoint TRP K corresponds to (K−1)th s-TRP.

Method 3) Applicable TRP information can be associated with logical channel priority information.

At least for one logical channel priority, applicable TRP list can be configured. For example, given that two TRPs are considered, the following mapping as shown in table 8 may be configured to the UE:

TABLE 8

| Logical channel priority | Applicable (allowed) TRPs |
|---|---|
| 1 | TRP1 |
| 2 | TRP1 |

TABLE 8-continued

| Logical channel priority | Applicable (allowed) TRPs |
|---|---|
| 3 | TRP1, TRP2 |
| 4 | <empty> |
| 5 | TRP2 |
| . . . | TRP2 |
| N | TRP2 |

For example, the mapping information may comprise information as illustrated in table 8. In method 3, logical channels with logical channel priority=1,2 are transmitted only via TRP1, and logical channels with logical channel priority=3,4 are transmitted via TRP1 and/or TRP2, and logical channels with logical channel priority=5, 젤, N are transmitted only via TRP2.

The above table 8 may be configured within serving cell configuration (ServingCellConfig). Alternatively, applicable TRP list may be configured for each logical channel. Alternatively, one or more logical channel priority thresholds to implement mapping between logical channel priorities and applicable TRPs may be configured.

For a two-TRP example, a logical channel priority threshold can be configured so that logical channels with logical channel priority values exceeding the threshold are only allowed to use p-TRP, and logical channels with logical channel priority values not exceeding the threshold are only allowed to use s-TRP.

For a two-TRP example, a logical channel priority threshold can be configured so that logical channels with logical channel priority values exceeding the threshold are only allowed to use s-TRP, and logical channels with logical channel priority values not exceeding the threshold are only allowed to use p-TRP.

For a two-TRP example, a logical channel priority threshold can be configured so that logical channels with logical channel priority values exceeding the threshold are allowed to use p-TRP and s-TRP, and logical channels with logical channel priority values not exceeding the threshold are only allowed to use s-TRP.

For a two-TRP example, a logical channel priority threshold can be configured so that logical channels with logical channel priority values exceeding the threshold are only allowed to use s-TRP, and logical channels with logical channel priority values not exceeding the threshold are allowed to use p-TRP and s-TRP.

If TRP restriction is applied to logical channel priority value:

logical channels are selected based on the logical channel priority values and allowed TRP configuration. That is, when selecting logical channels to transmit for the concerned UL grant scheduling a certain TRP, the logical channels for which the TRP is applicable/allowed are selected.

If TRP restriction is absent for a certain logical channel or logical channel priority value, the existing LCP rule is applied, i.e., no TRP restriction is enforced.

In step S1003, the UE may receive a UL grant associated with a TRP among the TRPs. The UE may identify the TRP among the TRPs based on the received UL grant.

According to various embodiments, the TRP may be associated with a CORESET in which a PDCCH for the UL grant is detected.

According to various embodiments, the TRP may be associated with a TCI state used for detecting a PDCCH for the UL grant. For example, one TRP is associated with a list of TCI states, and another TRP is associated with another list of TCI states, and the TCI states included in the different lists do not overlap.

According to various embodiments, the TRP may be associated with a HARQ process ID in the UL grant. For example, one TRP is associated with a list of HARQ process IDs, and another TRP is associated with another list of HARQ process IDs, and the HARQ process IDs included in the different lists do not overlap.

According to various embodiments, the one or more TRPs may be related to a same physical cell identifier (PCID or PCI) and communicate with the UE in different geographical locations.

The UE may identify associated TRP restriction upon reception of the UL grant in step S1003.

For example, the UE may identify an associated TRP to be used for data transmission based on information included in the UL grant received through the PDCCH and TRP-related configurations (e.g., TCI/QCL configuration information) configured in the UE.

In a multi-DCI mTRP operating environment, the UE can distinguish TRP based on CORESET pool index from which PDCCH for the UL grant is detected. In this case, CORESET pool index=TRP ID.

In an environment other than multi-DCI mTRP operating environment (i.e., single DCI mTRP), it may be difficult to distinguish TRP based on CORESET pool because only one CORESET pool is used. In this case, the TRP can be distinguished according to which beam/TCI state or QCL RS is used for the PDCCH (e.g., PDCCH for UL grant) and/or PDSCH received by the UE. For example, in a multi-cell mTRP environment, among the N TCI states, N1 TCI states can be set in relation to PCI #0 (=same PCI as serving cell) and N2 TCI states can be set in relation to PCI #1 (N=N1+ N2), using this method, TRP can be distinguished by TCI state ID or related PCI.

In step S1005, the UE may determine one or more logical channels associated with the TRP among the logical channels based on the mapping information. That is, the UE may apply restrictive logical channel prioritization.

For example, if the method 1 is used, when a new transmission is performed, MAC entity may select the logical channels for each UL grant that satisfy all or part of the following conditions:

the set of allowed Subcarrier Spacing index values in allowedSCS-List, if configured, includes the Subcarrier Spacing index associated to the UL grant; and/or maxPUSCH-Duration, if configured, is larger than or equal to the PUSCH transmission duration associated to the UL grant; and/or configuredGrantType1Allowed, if configured, is set to true in case the UL grant is a Configured Grant Type 1; and/or allowedServingCells, if configured, includes the Cell information associated to the UL grant. This does not apply to logical channels associated with a DRB configured with PDCP duplication within the same MAC entity (i.e., CA duplication) when CA duplication is deactivated for this DRB in this MAC entity; and/or allowedCG-List, if configured, includes the configured grant index associated to the UL grant; and/or allowedPHY-PriorityIndex, if configured, includes the priority index associated to the dynamic UL grant; and/or allowedTRP, if configured, includes the TRP associated to the dynamic UL grant.

The logical channels selected based on the allowedTRP and possibly allowedServingCells are already described above in the step S1001.

For example, if the method 2 is used, when a new transmission is performed, MAC entity may select the logical channels for the concerned UL grant that satisfy all or part of the following conditions:

the set of allowed Subcarrier Spacing index values in allowedSCS-List, if configured, includes the Subcarrier Spacing index associated to the UL grant; and/or maxPUSCH-Duration, if configured, is larger than or equal to the PUSCH transmission duration associated to the UL grant; and/or configuredGrantType1Allowed, if configured, is set to true in case the UL grant is a Configured Grant Type 1; and/or allowedServingCells, if configured, includes the Cell information associated to the UL grant. This does not apply to logical channels associated with a DRB configured with PDCP duplication within the same MAC entity (i.e., CA duplication) when CA duplication is deactivated for this DRB in this MAC entity; and/or allowedCG-List, if configured, includes the configured grant index associated to the UL grant; and/or allowedPHY-PriorityIndex, if configured, includes the priority index associated to the dynamic UL grant; and/or allowedTRPList, if configured, includes the TRP associated to the dynamic UL grant in accordance with allowedServingCells.

The logical channels selected based on the allowedTRPList and allowedServingCells are described above in the S1001.

For example, if the method 3 is used, when a new transmission is performed, MAC entity may select the logical channels for the concerned UL grant based on the logical channel priorities and the configured restriction between logical channel priorities and TRPs.

In step S1007, the UE may generate a MAC PDU of the one or more logical channels associated with the TRP. Based on the applied logical channel prioritization, the UE may generate a MAC PDU.

In step S1009, the UE may transmit the MAC PDU via the TRP. The UE may send the MAC PDU to network based on resources and information indicated by the UL grant and relevant configuration.

According to various embodiments, the UE may configure logical channels and TRPs. A first TRP may be associated with a first set of logical channels and a second TRP may be associated with a second set of logical channels. The UE may receive an uplink grant associated with a TRP. The UE may generate a MAC PDU containing the PDU of the logical channel(s) associated with the TRP. The UE may transmitting the MAC PDU.

Figure 11:
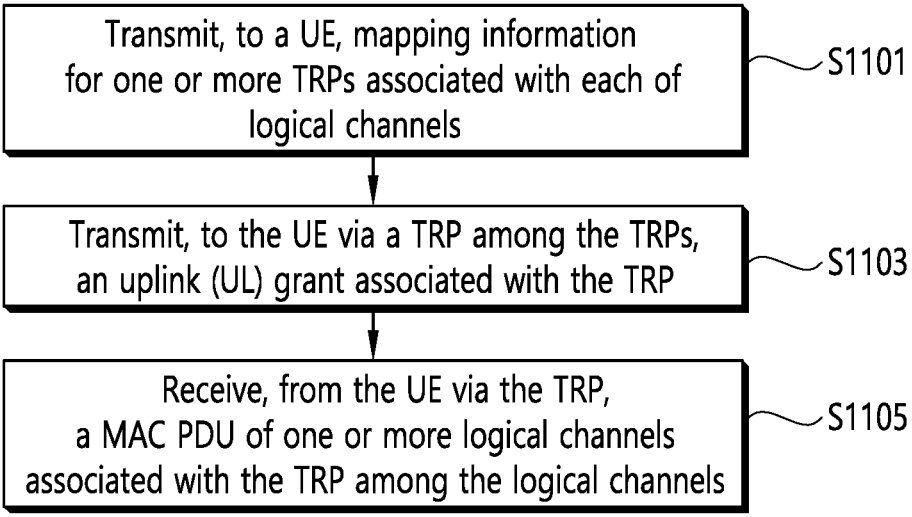
FIG. 11 shows an example of a method performed by a network node according to an embodiment of the present disclosure.

FIG. 11 shows an example of a method performed by a network node according to an embodiment of the present disclosure. For example, the network node may comprise a base station and may be associated with one or more TRPs.

Referring to FIG. 11, in step S1101, the network node may transmit, to a UE, mapping information for one or more TRPs associated with each of logical channels.

In step S1103, the network node may transmit, to the UE via a TRP among the TRPs, an uplink (UL) grant associated with the TRP.

In step S1105, the network node may receive, from the UE via the TRP, a MAC PDU of one or more logical channels associated with the TRP among the logical channels. The one or more logical channels associated with the TRP may be determined based on the mapping information.

Furthermore, the method in perspective of the UE described in the present disclosure (e.g., in FIG. 10) may be performed by the first wireless device 100 shown in FIG. 2 and/or the UE 100 shown in FIG. 3.

More specifically, the UE comprises at least one transceiver, at least processor, and at least one computer memory operably connectable to the at least one processor and storing instructions that, based on being executed by the at least one processor, perform operations.

The operations comprise: identifying mapping information for one or more transmit/receive points (TRPs) associated with each of logical channels: receiving an uplink (UL) grant associated with a TRP among the TRPs: determining one or more logical channels associated with the TRP among the logical channels based on the mapping information; generating a media access control (MAC) protocol data unit (PDU) of the one or more logical channels associated with the TRP; and transmitting the MAC PDU via the TRP.

Furthermore, the method in perspective of the UE described in the present disclosure (e.g., in FIG. 10) may be performed by a software code 105 stored in the memory 104 included in the first wireless device 100 shown in FIG. 2.

More specifically, at least one computer readable medium (CRM) stores instructions that, based on being executed by at least one processor, perform operations comprising: identifying mapping information for one or more transmit/receive points (TRPs) associated with each of logical channels: receiving an uplink (UL) grant associated with a TRP among the TRPs: determining one or more logical channels associated with the TRP among the logical channels based on the mapping information: generating a media access control (MAC) protocol data unit (PDU) of the one or more logical channels associated with the TRP; and transmitting the MAC PDU via the TRP.

Furthermore, the method in perspective of the UE described in the present disclosure (e.g., in FIG. 10) may be performed by control of the processor 102 included in the first wireless device 100 shown in FIG. 2 and/or by control of the processor 102 included in the UE 100 shown in FIG. 3.

More specifically, an apparatus configured to/adapted to operate in a wireless communication system (e.g., wireless device/UE) comprises at least processor, and at least one computer memory operably connectable to the at least one processor. The at least one processor is configured to/adapted to perform operations comprising: identifying mapping information for one or more transmit/receive points (TRPs) associated with each of logical channels; receiving an uplink (UL) grant associated with a TRP among the TRPs: determining one or more logical channels associated with the TRP among the logical channels based on the mapping information: generating a media access control (MAC) protocol data unit (PDU) of the one or more logical channels associated with the TRP; and transmitting the MAC PDU via the TRP.

Furthermore, the method in perspective of the network node described in the present disclosure (e.g., in FIG. 11) may be performed by the second wireless device 200 shown in FIG. 2.

More specifically, the network node comprises at least one transceiver, at least processor, and at least one computer memory operably connectable to the at least one processor and storing instructions that, based on being executed by the at least one processor, perform operations.

The operations comprise: transmitting, to a user equipment (UE), mapping information for one or more transmit/receive points (TRPs) associated with each of logical channels; transmitting, to the UE via a TRP among the TRPs, an uplink (UL) grant associated with the TRP; and receiving, from the UE via the TRP, a media access control (MAC) protocol data unit (PDU) of one or more logical channels associated with the TRP among the logical channels, wherein the one or more logical channels associated with the TRP is determined based on the mapping information.

The present disclosure may have various advantageous effects.

For example, by transmitting data over a suitable TRP that can support QoS requirement, QoS of the data can be achieved.

Advantageous effects which can be obtained through specific embodiments of the present disclosure are not limited to the advantageous effects listed above. For example, there may be a variety of technical effects that a person having ordinary skill in the related art can understand and/or derive from the present disclosure. Accordingly, the specific effects of the present disclosure are not limited to those explicitly described herein, but may include various effects that may be understood or derived from the technical features of the present disclosure.

Claims in the present disclosure can be combined in a various way. For instance, technical features in method claims of the present disclosure can be combined to be implemented or performed in an apparatus, and technical features in apparatus claims can be combined to be implemented or performed in a method. Further, technical features in method claim(s) and apparatus claim(s) can be combined to be implemented or performed in an apparatus. Further, technical features in method claim(s) and apparatus claim(s) can be combined to be implemented or performed in a method. Other implementations are within the scope of the following claims.

What is claimed is:

1. A method performed comprising:

obtaining mapping information for one or more-between logical channel priorities and transmit/receive points (TRPs), wherein each of the logical channel priorities is related to a corresponding one or more TRPs among the TRPs based on the mapping information;

receiving configurations for logical channels;

receiving an uplink grant related to a TRP;

selecting one or more logical channels for the uplink grant based on the one or more logical channels having logical channel priorities related to the TRP;

generating a media access control (MAC) protocol data unit (PDU) comprising the one or more logical channels; and transmitting the MAC PDU.

2. The method of claim 1, wherein the TRPs are related to one or more serving cells allowed for each of the logical channels.

3. The method of claim 2, wherein the one or more serving cells comprise all serving cells allowed for each of the logical channels.

4. The method of claim 2, wherein the mapping information comprises information for a corresponding one or more TRPs related to each of the one or more serving cells.

5. The method of claim 1, wherein the obtaining of the mapping information comprises receiving, from a network, the mapping information via a message.

6. The method of claim 5, wherein the message comprises at least one of a radio resource control (RRC) setup message, RRC resume message or RRC reconfiguration message.

7. The method of claim 1, wherein the TRP is related to a control resource set (CORESET) in which a physical downlink control channel (PDCCH) for the uplink grant is detected.

8. The method of claim 1, wherein the TRP is related to a transmission configuration indication (TCI) state used for detecting a physical downlink control channel (PDCCH) for the uplink grant.

9. The method of claim 1, wherein the TRP is related to a hybrid automatic repeat request (HARQ) process identifier (ID) in the uplink grant.

10. The method of claim 1, wherein the TRPs are related to a same physical cell identifier (ID) and located in different geographical locations.

11. The method of claim 1, wherein the method is performed by a user equipment (UE) in communication with at least one of a mobile device, a network, or autonomous vehicles.

12. A user equipment (UE) comprising:

at least one transceiver;

at least one processor; and at least one memory operatively coupled to the at least one processor and storing instructions that, based on being executed by the at least one processor, perform operations comprising:

obtaining mapping information between logical channel priorities and transmit/receive points (TRPs), wherein each of the logical channel priorities is related to a corresponding one or more TRPs among the TRPs based on the mapping information;

receiving configurations for logical channels;

receiving an uplink grant related to a TRP;

selecting one or more logical channels for the uplink grant based on the one or more logical channels having logical channel priorities related to the TRP;

generating a media access control (MAC) protocol data unit (PDU) comprising the one or more logical channels; and transmitting the MAC PDU.

* * * * *